United States Patent
Ishihara et al.

(10) Patent No.: US 9,678,988 B2
(45) Date of Patent: Jun. 13, 2017

(54) IMAGE PROCESSING APPARATUS AND IMAGE PROCESSING METHOD

(71) Applicant: FUJITSU LIMITED, Kawasaki-shi, Kanagawa (JP)

(72) Inventors: Masaki Ishihara, Kawasaki (JP); Yuji Matsuda, Kawasaki (JP); Masahiko Sugimura, Kawasaki (JP); Susumu Endo, Kawasaki (JP); Takayuki Baba, Kawasaki (JP); Yusuke Uehara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/920,643

(22) Filed: Oct. 22, 2015

(65) Prior Publication Data
US 2016/0125262 A1    May 5, 2016

(30) Foreign Application Priority Data
Nov. 4, 2014  (JP) ................................. 2014-224046

(51) Int. Cl.
*G06K 9/00* (2006.01)
*G06F 17/30* (2006.01)
(Continued)

(52) U.S. Cl.
CPC .. *G06F 17/30247* (2013.01); *G06F 17/30259* (2013.01); *G06K 9/4638* (2013.01); *G06T 7/73* (2017.01); *G06T 11/003* (2013.01); *G06K 2209/051* (2013.01); *G06T 2207/10081* (2013.01)

(58) Field of Classification Search
None
See application file for complete search history.

(56) References Cited

U.S. PATENT DOCUMENTS 5,186,174 A * 2/1993 Schlondorff ........... A61B 6/501
  378/4
5,825,908 A * 10/1998 Pieper ..................... G06T 7/602
  382/131
(Continued)

FOREIGN PATENT DOCUMENTS

JP   2007-117712   5/2007
JP   2009-160045   7/2009
(Continued)

*Primary Examiner* — Shervin Nakhjavan
(74) *Attorney, Agent, or Firm* — Fujitsu Patent Center

(57) ABSTRACT

An image processing apparatus receives an input specifying a target in a first captured image group that is obtained by slicing a three-dimensional body into captured images at a first point in time, extracts feature points surrounding the specified target from the captured images of the first captured image group, specifies slice positions of each of the feature points that are extracted in captured images of a second captured image group that is obtained by slicing the three-dimensional body into the captured images at a second point in time, and outputs an image corresponding to a slice position range specified based on the specified slice positions of each of the extracted feature points, and corresponding to a range on a first plane specified based on positions of each of the extracted feature points on a second plane.

17 Claims, 23 Drawing Sheets

(51) Int. Cl.
*G06T 11/00* (2006.01)
*G06K 9/46* (2006.01)
*G06T 7/73* (2017.01)

(56) References Cited

U.S. PATENT DOCUMENTS

| | | | |
|---|---|---|---|
| 6,289,235 B1* | 9/2001 | Webber | A61B 6/12 378/23 |
| 2007/0098241 A1 | 5/2007 | Wang et al. | |
| 2008/0242978 A1* | 10/2008 | Simon | A61B 90/36 600/426 |
| 2011/0075901 A1* | 3/2011 | Nakamura | G06F 19/321 382/128 |
| 2011/0170784 A1 | 7/2011 | Tanaka et al. | |
| 2012/0053454 A1 | 3/2012 | Wang et al. | |
| 2012/0093278 A1* | 4/2012 | Tsukagoshi | G06T 11/008 378/4 |
| 2013/0243285 A1 | 9/2013 | Wang et al. | |
| 2016/0117797 A1* | 4/2016 | Li | G06T 3/0081 382/128 |

FOREIGN PATENT DOCUMENTS

| | | |
|---|---|---|
| JP | 2012-045313 | 3/2012 |
| JP | 2013-223620 | 10/2013 |
| WO | 2009/150882 | 12/2009 |

\* cited by examiner

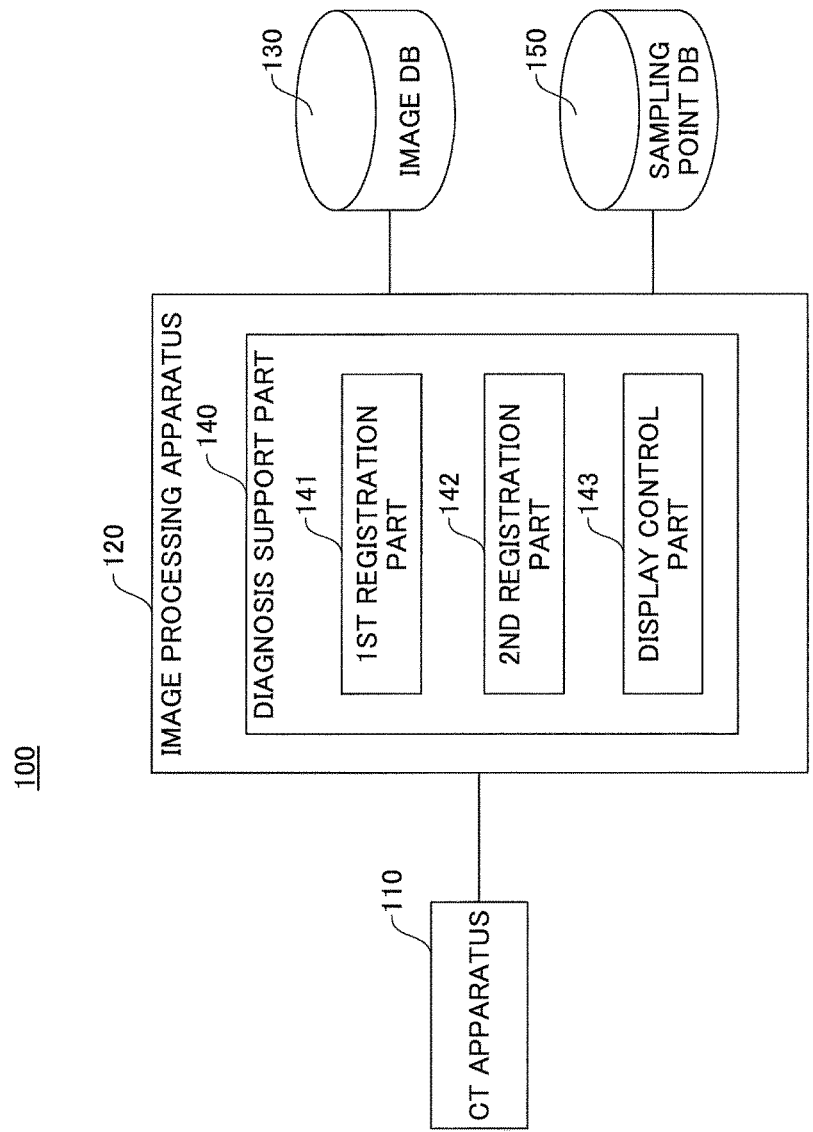

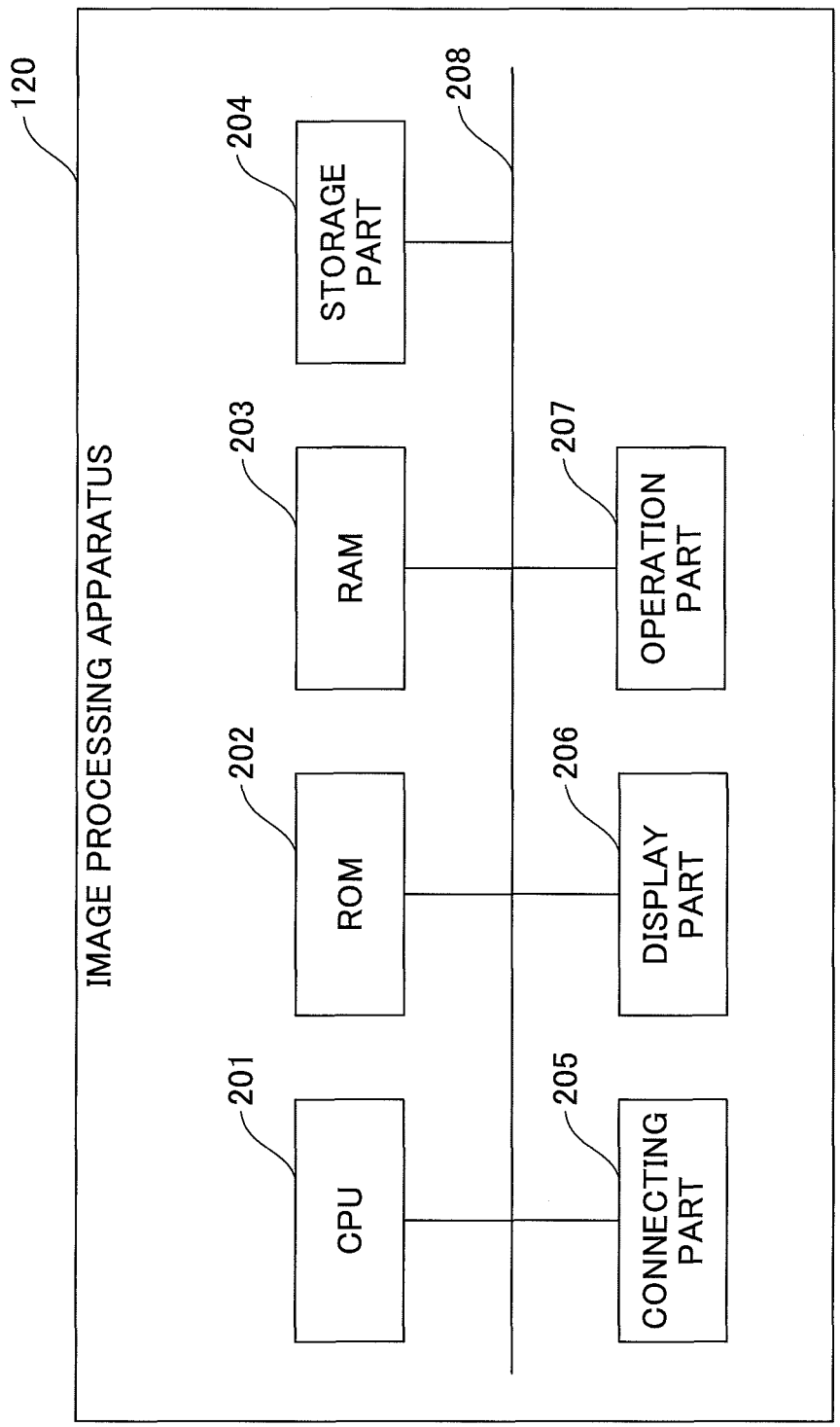

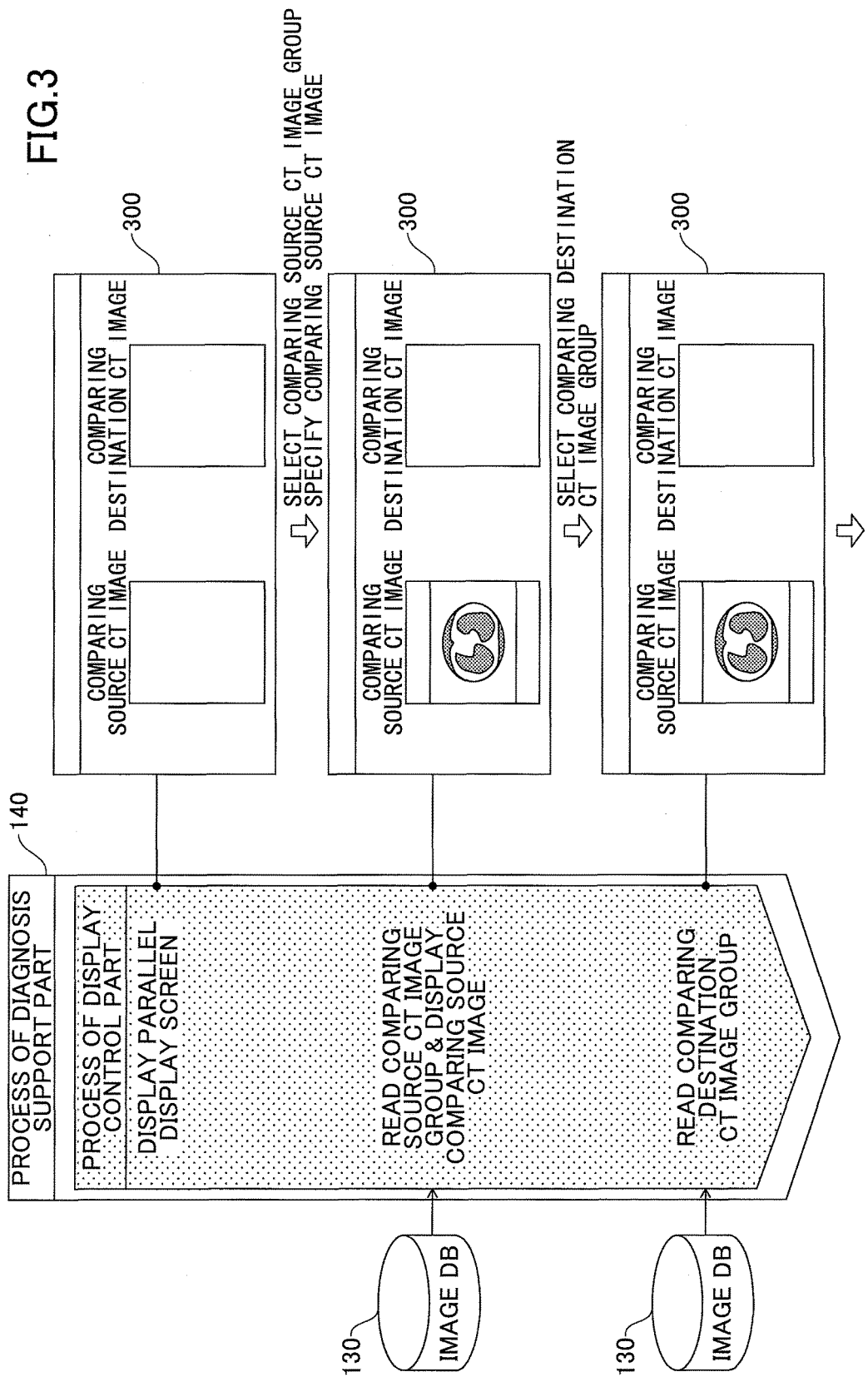

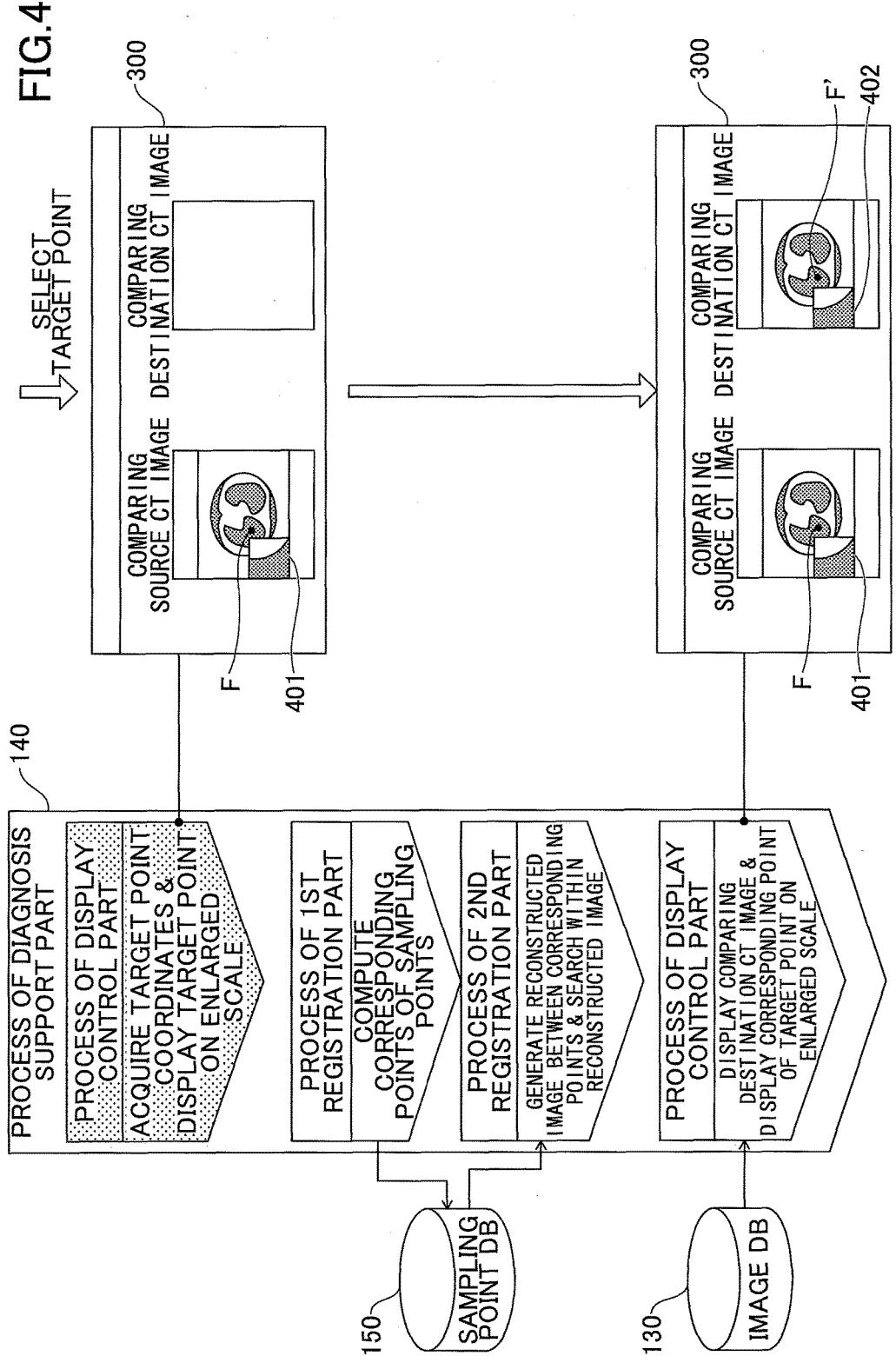

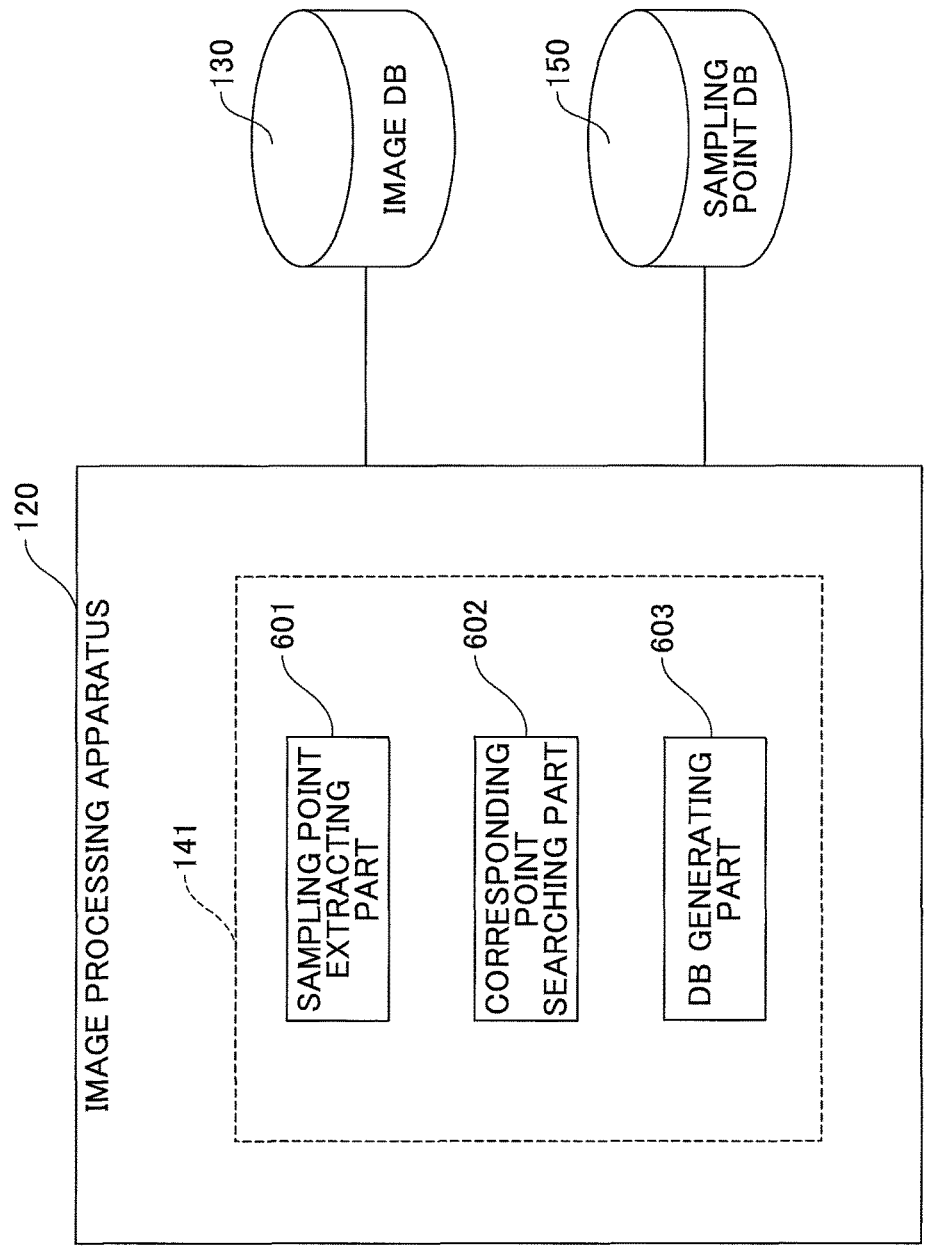

| COMPARING SOURCE CT IMAGE || COMPARING DESTINATION CT IMAGE ||
|---|---|---|---|
| POINT A | (100, 256, 50) | POINT A' | (100, 256, 55) |
| POINT B | (302, 256, 50) | POINT B' | (302, 256, 49) |
| POINT C | (403, 256, 50) | POINT C' | (403, 256, 48) |

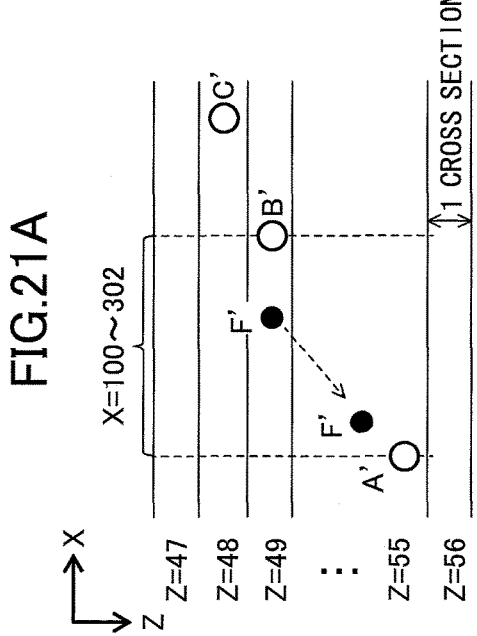
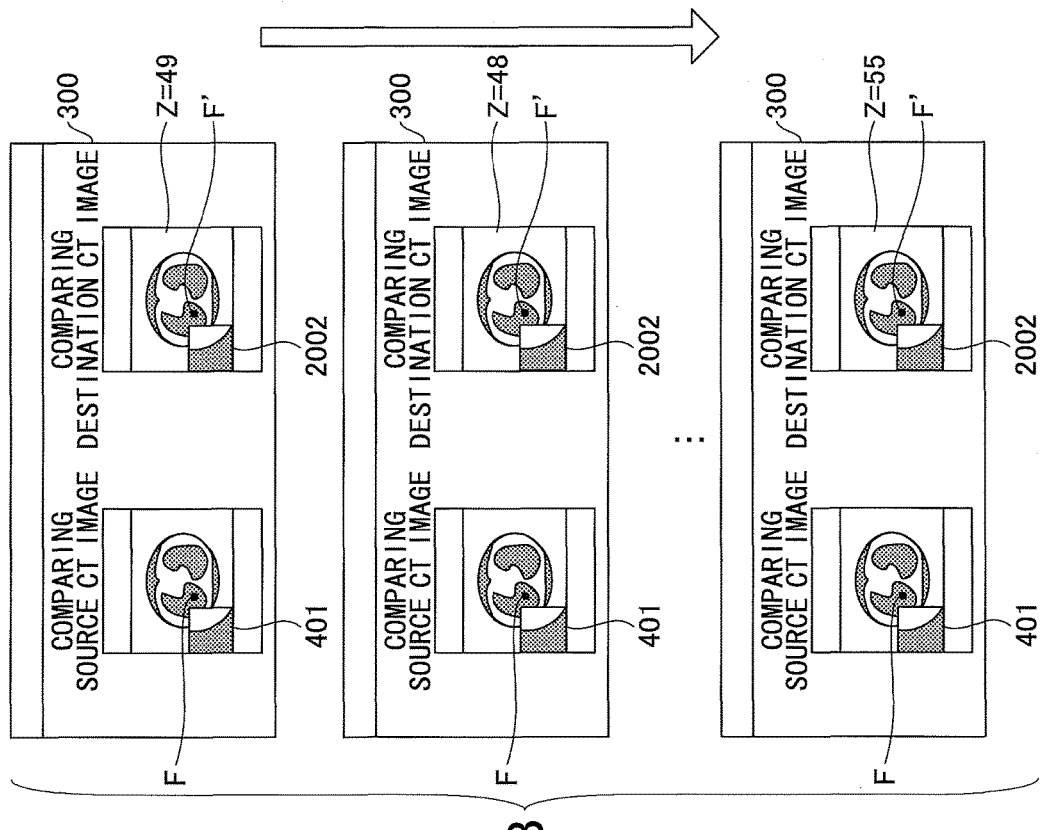

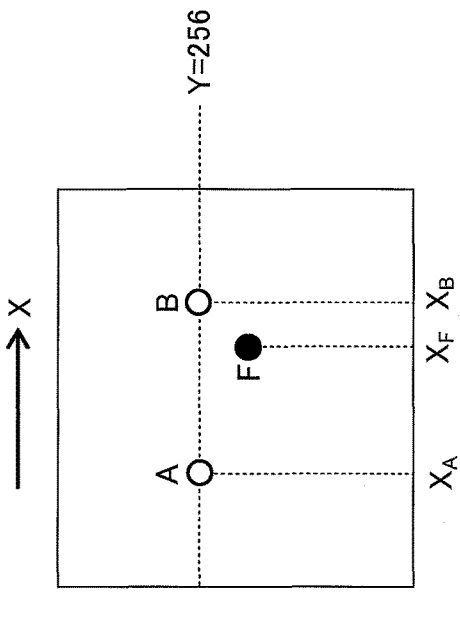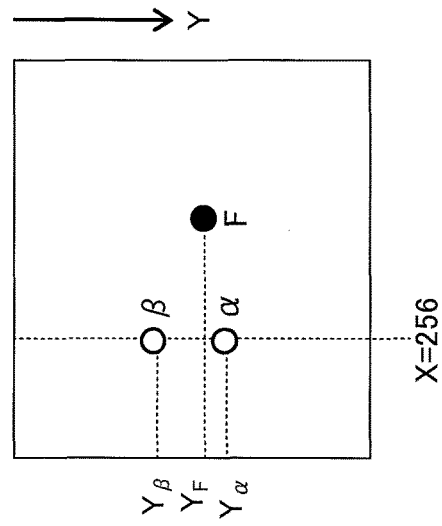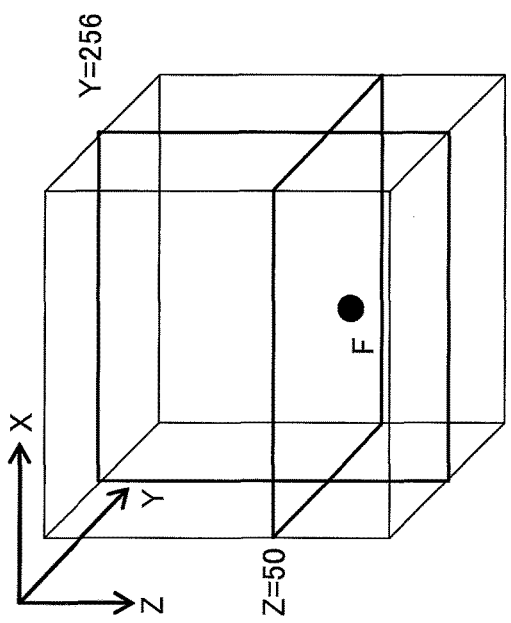

IMAGE PROCESSING APPARATUS AND IMAGE PROCESSING METHOD

CROSS-REFERENCE TO RELATED APPLICATIONS

This application is based upon and claims the benefit of priority of the prior Japanese Patent Application No. 2014-224046, filed on Nov. 4, 2014, the entire contents of which are incorporated herein by reference.

FIELD

The embodiments discussed herein are related to an image processing apparatus, an image processing method, and a computer-readable storage medium having stored therein an image processing program.

BACKGROUND

In the medical profession, a physician may wish to confirm a change in a diseased or affected part after a lapse of time. In a case in which a CT (Computed Tomography) apparatus is used to make this confirmation, for example, images of the same diseased or affected part need to be extracted from groups of CT images captured at different points in time.

The CT apparatus generates images of the body sliced from a parietal in a direction towards a toe. In a case in which a position of a desired body part does not change within the body, and a position of the image of this desired body part in a sequence of images from the parietal or the toe can be specified in the group of CT images captured at another point in time, the images at the specified position in the sequence of images can be extracted from the groups of CT images captured at different points in time, so as to obtain the images of this desired body part.

An example of the related art is described in International Publication Pamphlet No. WO2009/150882, for example.

However, the position of a tip end part (a side farther away from a bronchial tube) of a lung, or the like moves up and down, for example, depending on a movement of a diaphragm at a time of breathing, and a slice position of the image capturing the desired body part may change. For this reason, it is difficult to determine the position of the image of the desired body part in the sequence of images captured at one point in time, in the sequence of images captured at another point in time.

A technique that compares features of images may be used to search, from the group of CT images captured at the other point in time, the body part having features similar to those of the desired body part included in the group of CT images captured at the one point in time. In this case, it is necessary to detect the features from the plurality of sliced images, and to collate the sliced images captured at the different points in time in order to find a match. For this reason, it takes a long processing time to search and find the image of the body part similar to the desired body part, and the search for the image of the body part having the features similar to those of the desired body part may not be completed within a desired length of time.

SUMMARY

Accordingly, it is an object in one aspect of the embodiments to provide an image processing apparatus, an image processing method, and a computer-readable storage medium, which can reduce a processing time required to search and find a target that is specified in an image captured at one point in time from images captured at another point in time.

According to one aspect of the embodiments, an image processing apparatus includes a memory configured to store a program; and a processor configured to execute the program and perform a process including receiving an input specifying a target in a first captured image group that is obtained by slicing a three-dimensional body into a plurality of captured images at a first point in time, extracting a plurality of feature points surrounding the specified target from the plurality of captured images of the first captured image group, specifying slice positions of each of the plurality of feature points that are extracted in a plurality of captured images of a second captured image group that is obtained by slicing the three-dimensional body into the plurality of captured images at a second point in time, and outputting an image corresponding to a slice position range specified based on the specified slice positions of each of the plurality of extracted feature points, and corresponding to a range on a first plane specified based on positions of each of the plurality of extracted feature points on a second plane.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of a CT image capturing system;

FIG. 2 is a diagram illustrating a hardware configuration of an image processing apparatus;

FIG. 3 is a diagram illustrating a relationship of processing contents of a diagnosis support part, operation contents of a user, and display contents of a display screen in the image processing apparatus;

FIG. 4 is a diagram illustrating a relationship of the processing contents of the diagnosis support part, the operation contents of the user, and display contents of a parallel display screen in the image processing apparatus;

FIG. 6 is a diagram illustrating a functional configuration of a first registration part;

FIGS. 21A and 21B are diagrams illustrating an example of a change in the parallel display screen;

FIGS. 24A, 24B, and 24C are diagrams for explaining a positional relationship of the target point and the sampling points.

DESCRIPTION OF EMBODIMENTS

Figure 5A:
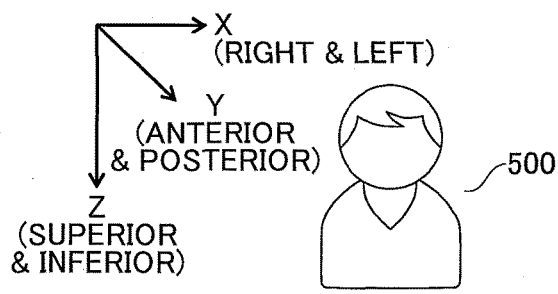
FIGS. 5A, 5B, and 5C are diagrams for explaining a relationship of an orientation of a patient and coordinate axes, and a characteristic of a captured region.

Preferred embodiments of the present invention will be described with reference to the accompanying drawings.

A description will now be given of an image processing apparatus, an image processing method, and a computer-readable storage medium in each embodiment according to the present invention. In the specification and drawings, those constituent elements that have substantially the same configuration and/or function are designated by the same reference numerals, and a description thereof will not be repeated.

First Embodiment

First, a description will be given of a CT (Computed Tomography) image capturing system that includes an image processing apparatus in a first embodiment. FIG. 1 is a diagram illustrating an example of the CT image capturing system.

A CT image capturing system 100 includes a CT apparatus 110 and an image processing apparatus 120. The CT apparatus 110 and the image processing apparatus 120 are electrically connected, and data can be transmitted and received between the two apparatuses 110 and 120.

The CT apparatus 110 scans inside a patient's body using radiation or the like, and performs process using a computer to generate CT images, which are sliced images of the patient. In the following description, "generating" the CT images may also be referred to as "capturing" the CT images. The CT apparatus 110 sends the captured CT images to the image processing apparatus 120.

The image processing apparatus 120 stores the CT images captured by the CT apparatus 110, and displays the CT images captured at difference points in time (for example, a first point in time and a second point in time) in parallel.

The image processing apparatus 120 includes a diagnosis support part 140, and is connected to an image DB (Data-Base) 130 and a sampling point DB (Data-Base) 150.

The image DB 130 stores the CT images captured by the CT apparatus 110. The image DB 130 stores the CT images sent from the CT apparatus 110 in separate groups of CT images, where each group of CT images includes the CT images captured at the same point in time.

The diagnosis support part 140 is a function utilized by health care professionals, such as physicians or the like, when diagnosing the patient. This function may be achieved by a computer when the computer executes a diagnosis support program, for example.

The diagnosis support part 140 displays the CT images captured at different points in time, for example, in parallel so that the health care professional can diagnose the patient by comparing the CT images. In the following description, one of two CT images displayed in parallel, such as one CT image captured before prescribing medication, may also be referred to as "a comparing source CT image". On the other hand, the other of the two CT images displayed in parallel, such as the other CT image capture after prescribing medication, may also be referred to as "a comparing destination CT image".

The diagnosis support part 140 displays a target (or target point) specified by the health care professional on an enlarged scale within the comparing source CT image. In addition, the diagnosis support part 140 extracts the comparing destination CT image in which a corresponding point corresponding to the specified target point (that is, a point similar to the target point and having a similarity exceeding a threshold value) is captured, and displays a region including the corresponding point on an enlarged scale in an enlarged display screen.

In order to perform the above processes, the diagnosis support part 140 includes a first registration part 141, a second registration part 142, and a display control part 143.

A function of the first registration part 141 is achieved by the computer when the computer executes a first registration program. The first registration part 141 extracts from the comparing source CT image a plurality of feature points, which are sampling points surrounding the target point, based on the target point specified by the health care professional. In addition, the first registration part 141 computes corresponding points of the comparing destination CT image, corresponding to the extracted sampling points. Further, the first registration part 141 relates the computed corresponding points to the sampling points, to obtain and store sampling point information in the sampling point DB 150.

A function of the second registration part 142 is achieved by the computer when the computer executes a second registration program. The second registration part 142 generates a reconstructed image between the corresponding points of the sampling points, based on the corresponding points of the sampling points computed by the first registration part 141. In addition, the second registration part 142 uses the generated reconstructed image as a search range in which a search is performed to extract the corresponding point of the target point, and notifies coordinates of the corresponding point of the target point, together with the generated reconstructed image, to the display control part 143.

A function of the display control part 143 is achieved by the computer when the computer executes a display program. The display control part 143 displays the comparing source CT image selected by the health care professional, and also displays the target point specified by the health care professional on an enlarged scale. In addition, the display control part 143 displays the comparing destination CT image in which the corresponding point of the target point notified from the second registration part 142 is captured, and also displays the notified reconstructed image, as the region including the corresponding point of the target point, on an enlarged scale on the enlarged display screen.

The sampling point DB 150 stores the corresponding points of the sampling points, computed by the first registration part 141, in correspondence with the sampling points.

Next, a description will be given of a hardware configuration of the image processing apparatus 120. FIG. 2 is a diagram illustrating the hardware configuration of the image processing apparatus. As illustrated in FIG. 2, the image processing apparatus 120 includes a CPU (Central Processing Unit) 201, a ROM (Read Only Memory) 202, and a RAM (Random Access Memory) 203. In addition, the image processing apparatus 120 includes a storage part 204, a connecting part 205, a display part 206, and an operation part 207. Each of the parts of the image processing apparatus 120 are mutually connected via a bus 208.

The CPU 201 is an example of the computer which can execute various programs stored in the storage part 204, such as the first registration program, the second registration program, the display program, or the like.

The ROM 202 is an example of a non-volatile memory. The ROM 202 stores various programs, data, or the like that are required in order to the CPU 201 to execute the various programs stored in the storage part 204. More particularly, the ROM 202 stores boot programs such as a BIOS (Basic Input/Output System), an EFI (Extensible Firmware Interface), or the like.

The RAM 203 is an example of a main storage such as a DRAM (Dynamic Random Access Memory), an SRAM (Static Random Access Memory), or the like. The RAM 203 functions as a work region that is used when the CPU 201 executes the various programs stored in the storage part 204.

The storage part 204 is an example of a non-transitory computer-readable storage medium to store the various programs that are installed in the image processing apparatus 120, the data generated when the various programs are executed, or the like. For example, recording media usable for the non-transitory computer-readable storage medium include a hard disk, an optical disk, a magneto-optic disk, a CD-ROM (Compact Disk-Read Only Memory), a CD-R (Compact Disk-Recordable), a magnetic tape, a non-volatile memory card, a ROM, or the like.

The connecting part 205 connects to the CT apparatus 110, and exchanges data with the CT apparatus 110. The display part 206 displays the CT images captured by the CT apparatus 110 and stored in the image DB 130. The operation part 207 receives or accepts various operations performed by the health care professional with respect to the image processing apparatus 120.

Next, a description will be given of a relationship of processing contents of the diagnosis support part 140 of the image processing apparatus 120, operation contents of a user, and display contents displayed on the display part 206 of the image processing apparatus 120.

FIGS. 3 and 4 are diagrams illustrating the relationship of the processing contents of the diagnosis support part, the operation contents of the user, and the display contents of the display screen in the image processing apparatus.

When the process of the diagnosis support part 140 starts in the image processing apparatus 120, the process of the display control part 143 starts as illustrated in FIG. 3, and the display part 206 displays a parallel display screen 300 for displaying in parallel the CT images that are captured at different points in time. In a state in which the parallel display screen 300 is displayed, the health care professional selects, as a comparing source CT image group (or first captured group), a captured image group of a predetermined body part of a predetermined patient captured at a predetermined point in time. Hence, the display control part 143 reads the selected comparing source CT image group from the image DB 130. Further, when the health care professional specifies a predetermined comparing source CT image from the selected comparing source CT image group, the display control part 143 displays the specified comparing source CT image on the parallel display screen 300.

The health care professional selects, as a comparing destination CT image group (or second captured image group), a captured image group of the same predetermined body part of the same predetermined patient captured at different points in time, to be compared with the specified comparing source CT image. More particularly, the health care professional inputs a patient's name, a date and time of image capture, a body part that is captured, or the like. Accordingly, the display control part 143 reads, as the comparing destination CT image group, a captured image group that is identified by the patient's name, the date and time of the image capture, the body part that is captured, or the like that are input, from the image DB 130.

As illustrated in FIG. 4, when the health care professional further specifies a target point F in the comparing source CT image that is displayed, the display control part 143 acquires coordinates of the specified target point F, and notifies the acquired coordinates to the first registration part 141. In addition, the display control part 143 displays on the comparing source CT image an enlarged display screen 401 that displays a region including the target point F on an enlarged scale.

The first registration part 141 extracts the sampling points based on the coordinates of the target point F, computes the corresponding points that correspond to the extracted sampling points from the comparing destination CT image group, and stores the corresponding points in correspondence with the sampling points in the sampling point DB 150, as the sampling point information. The second registration part 142 generates the reconstructed image using the comparing destination CT image group located between the computed corresponding points of the sampling points. The second registration part 142 searches within the generated reconstructed image to extract the corresponding point of the target point F. The second registration part 142 notifies the generated reconstructed image, and coordinates of the corresponding point of the target point F found by the search, to the display control part 143.

The display control part 143 displays the comparing destination CT image in which a corresponding point F' corresponding to the target point F is captured, together with the corresponding point F', based on the coordinates of the corresponding point of the target point F notified from the second registration part 142. In addition, the display control part 143 performs a process on the reconstructed image notified from the second registration part 142 to cut out and enlarge a region including the corresponding point F', and displays the cut out and enlarged region, as an enlarged display screen 402, on the comparing destination CT image.

According to the image processing apparatus 120, it is possible to automatically extract the comparing destination CT image in which the corresponding point F' corresponding to the target point F specified by the health care professional in the comparing source CT image is captured, and display the comparing destination CT image together with the enlarged display screen 402. For this reason, the health care professional can easily be aware of the corresponding parts of each of the CT images included in the captured image groups captured at different points in time, and can thus easily compare the CT images of the diseased or affected part captured at different points in time in order to detect changes in the diseased or affected part.

Next, a description will be given of the parts of the diagnosis support part 140, particularly the first registration part 141 and the second registration part 142.

Figure 5B:
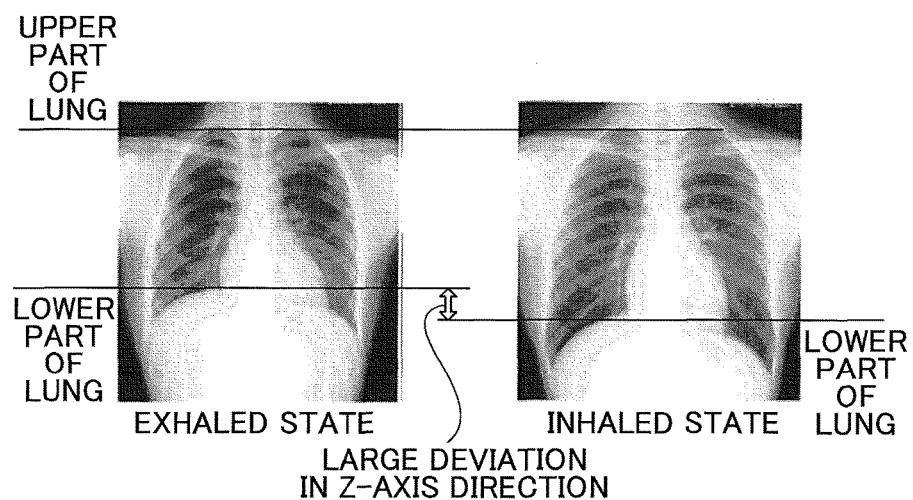
Figure 5C:
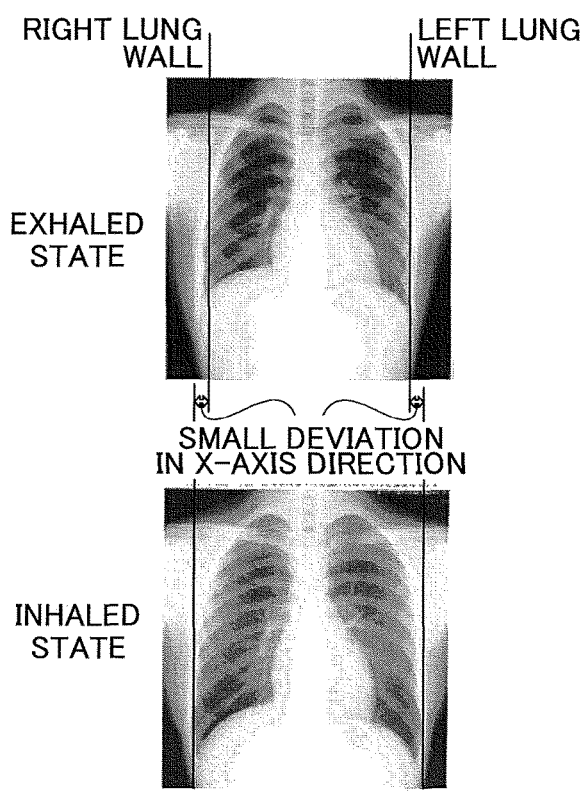

First, a description will be given of a relationship between the orientation of the patient that is a three-dimensional capturing target, and coordinate axes that are the X-axis, the Y-axis, and the Z-axis. In addition, a description will also be given of a characteristic of a chest of the patient, that is an example of a captured region of the CT apparatus 110. FIGS. 5A, 5B, and 5C are diagrams for explaining the relationship of the orientation of the patient and the coordinate axes, and the characteristic of the captured region.

As illustrated in FIG. 5A, in this embodiment, left and right directions of a patient 500 are defined as the X-axis direction, anterior and posterior directions of the patient 500 are defined as the Y-axis direction, and superior and inferior directions of the patient 500 are defined as the Z-axis direction. The CT apparatus 110 generates a plurality of CT images of the patient 500 sliced on the XY-plane along the Z-axis direction, and sends the generated CT images to the image processing apparatus 120.

The position of the chest of the patient 500 changes depending on a movement of a diaphragm at a time of breathing. A description will be given of this change in the position of the chest of the patient 500, by referring to X-ray photographs illustrated in FIGS. 5B and 5C. Because the diaphragm moves in the Z-axis direction when the patient 500 breathes, when a position at an upper part of a lung in an exhaled state illustrated at the left in FIG. 5B and the position at the upper part of the lung in an inhaled state illustrated at the right in FIG. 5B are matched to compare the images of the lung, a position at a lower part of the lung greatly differs in the Z-axis direction between the images.

On the other hand, when a center position between right and left lungs in the exhaled state illustrated at the top in FIG. 5C and the center position between the right and left lungs in the inhaled state illustrated at the bottom in FIG. 5C are matched to compare the images of the right and left lungs, the positions of right and left lung walls only slight differ in the X-axis direction between the images. Similarly, although not illustrated, the positions of the right and left lung walls only slightly differ in the Y-axis direction between the images in the exhaled and inhaled states.

In other words, the chest of the patient captured in the CT images that are processed by the image processing apparatus 120 has a characteristic such that the positional deviation caused by the breathing is large in the Z-axis direction and small in the X-axis direction and the Y-axis direction.

Next, a more detailed description will be given of the functions of the first registration part 141. FIG. 6 is a diagram illustrating a functional configuration of the first registration part.

As illustrated in FIG. 6, in the image processing apparatus 120, the first registration part 141 causes the computer to function as a sampling point extracting part 601, a corresponding point searching part 602, and a DB generating part 603.

The sampling point extracting part 601 extracts the sampling points from the comparing source CT image, according to the target point specified by the user in the comparing source CT image.

The corresponding point searching part 602 searches the corresponding points corresponding to the sampling points extracted by the sampling point extracting part 601, from the comparing destination CT image group.

The DB generating part 603 generates the sampling point information by writing the corresponding points in the comparing destination CT image group searched by the corresponding point searching part 602, in correspondence with the sampling points of the comparing source CT image, in the sampling point information. The sampling point information generated by the DB generating part 603 is stored in the sampling point DB 150.

Figure 7:
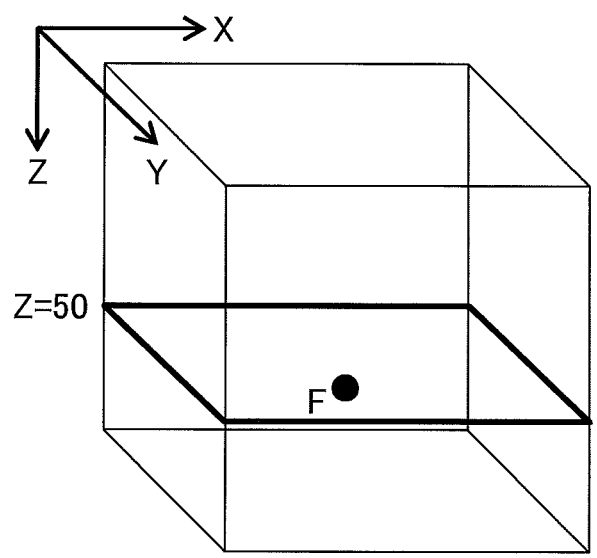
FIG. 7 is a diagram illustrating a selected comparing source CT image and a specified target point.

Next, a description will be given of a particular example of the process of the first registration part 141, by referring to FIGS. 7 through 9. FIG. 7 is a diagram illustrating the selected comparing source CT image and the specified target point. FIG. 7 illustrates a state of an example in which an XY-plane image at Z=50 is selected as the comparing source CT image, and the target point F is specified in the comparing source CT image.

FIGS. 8A, 8B, 8C, and 8D are diagrams illustrating a relationship of the target point and the sampling points in the comparing source CT image, and a relationship of the sampling points in the comparing source CT image and the corresponding points in the comparing destination CT image.

Figure 8B:
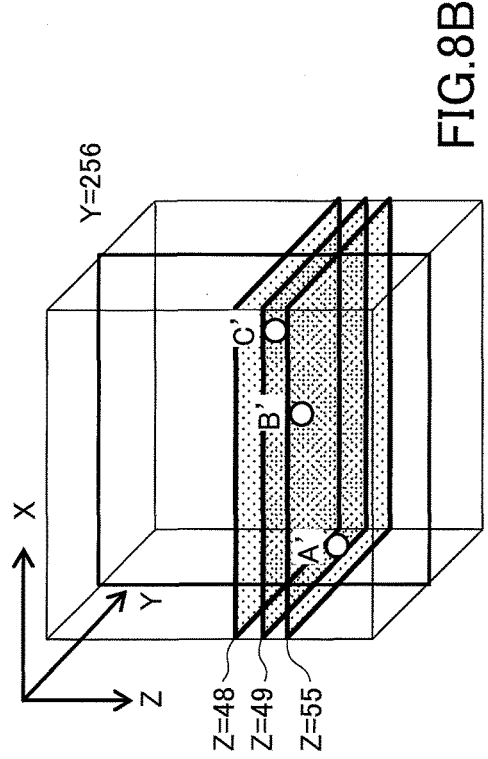
FIGS. 8A, 8B, 8C, and 8D are diagrams illustrating a relationship of the target point and sampling points in the comparing source CT image, and a relationship of the sampling points in the comparing source CT image and corresponding points in a comparing destination CT image.
Figure 8D:
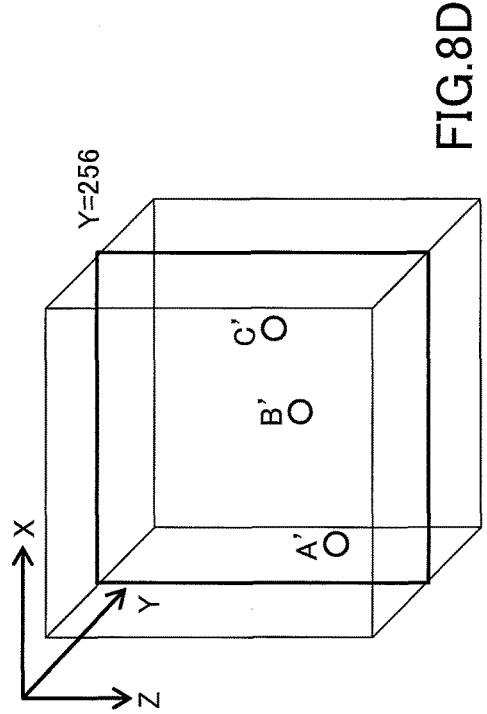
Figure 8A:
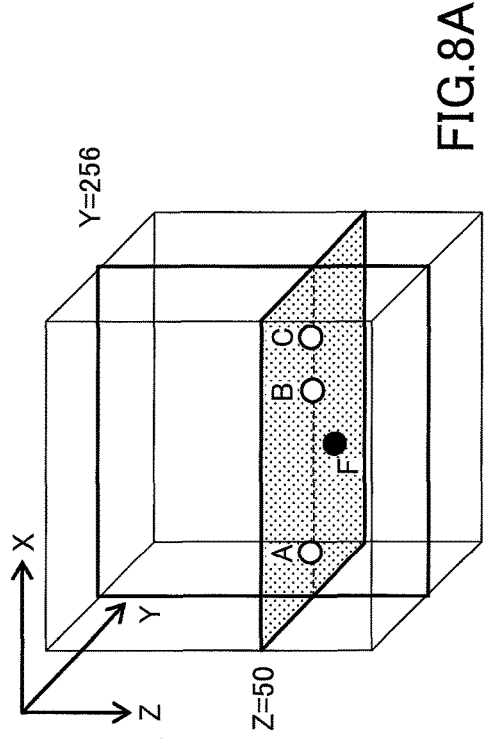

As illustrated in FIG. 8A, the sampling point extracting part 601 computes a vertical cross section image (XZ-plane image) having a predetermined Y-coordinate (Y=256 in the example illustrated in FIG. 8A), based on the comparing source CT image group. The sampling point extracting part 601 extracts the comparing source CT image (XY-plane image at Z=50) selected by the health care professional, from the comparing source CT image group. In addition, the sampling point extracting part 601 extracts a plurality of sampling points (points A, B, and C in the example illustrated in FIG. 8A) from a straight line (indicated by a dotted line in FIG. 8A) where the XZ-plane image that is computed and the XY-plane image that is selected by the health care professional intersect. In this case, the sampling point extracting part 601 extracts the plurality of sampling points so as to surround the target point F.

The corresponding point searching part 602 searches the corresponding points in the comparing destination CT image group, for each of the plurality of sampling points (points A, B, and C) that are extracted. More particularly, the corresponding point searching part 602 searches the corresponding points with respect to a search target that is the XZ-plane image having the predetermined Y-coordinate (Y-coordinate Y=256 used when extracting the sampling points in the comparing source CT image) computed based on the comparing destination CT image group.

FIG. 8B illustrates a result of the search performed by the corresponding point searching part 602 to search the corresponding points corresponding to each of the sampling points (points A, B, and C), using the XZ-plane image having the predetermined Y-coordinate (Y=256) as the search target computed based on the comparing destination CT image group. FIG. 8B illustrates a state in which points A', B', and C' are computed as the corresponding points corresponding to each of the sampling points (points A, B, and C). It is assumed for the sake of convenience that the points A', B', and C' exist in the XY-plane image at Z=55, the XY-plane image at Z=49, and the XY-plane image at Z=48, respectively. In other words, it is assumed for the sake of convenience that the points A', B', and C' are located on different XY-plane images.

The corresponding point is not necessarily extracted from the comparing destination CT image group with respect to all of the sampling points extracted from the comparing source CT image group.

Figure 8C:
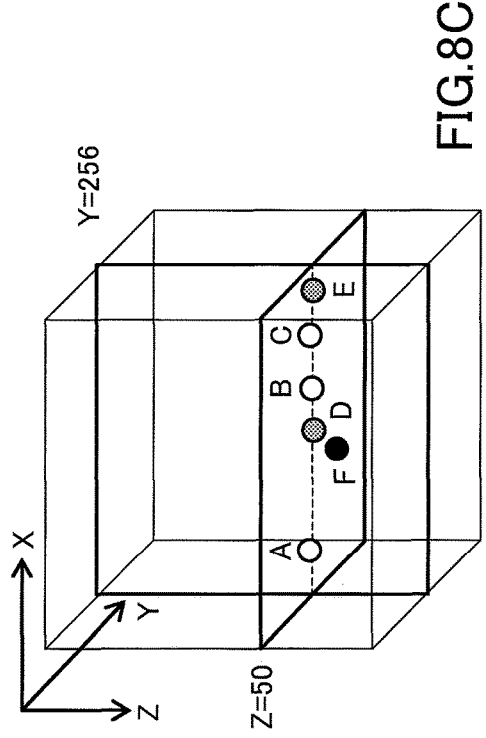

FIG. 8C illustrates a case in which the sampling points (points A, B, C, D, and E) are extracted from a straight line where the XZ-plane image (XZ-plane image at Y=256) and the XY-plane image (XY-plane image at Z=50) intersect, based on the specified target point F. With respect to the points D and E, no corresponding points exist within the XZ-plane image (XZ-plane image at Y=256) computed based on the computing destination CT image group, as illustrated in FIG. 8D.

Figures 9, 10:
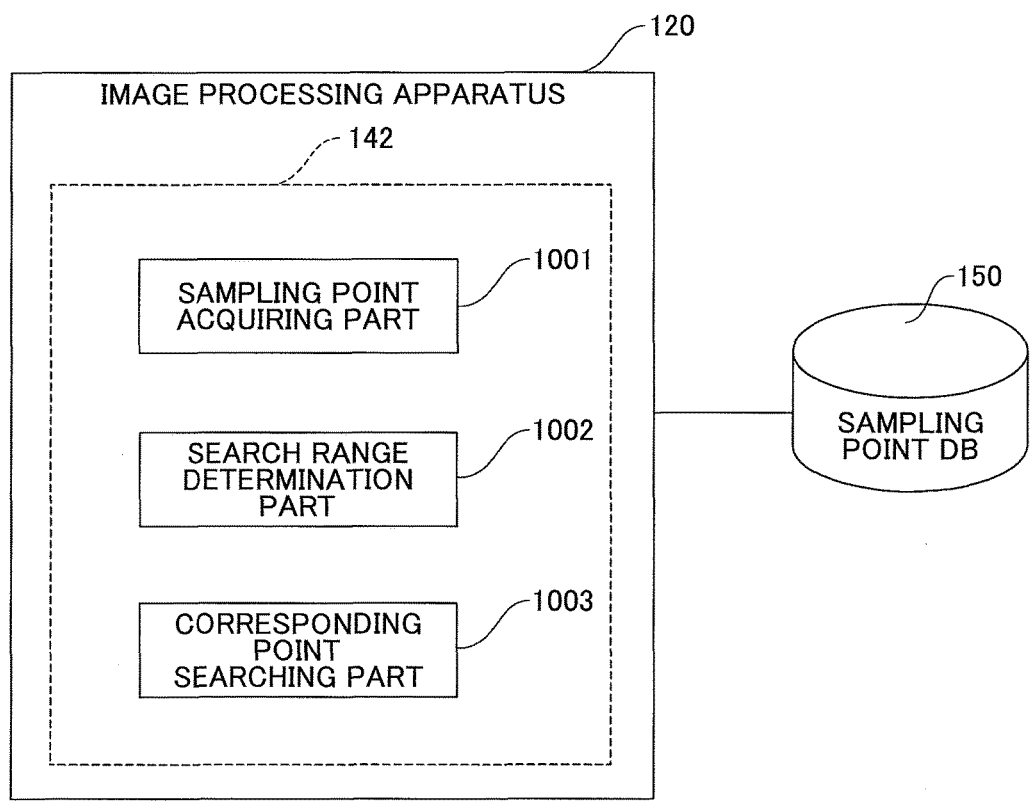
FIG. 9 is a diagram illustrating an example of sampling point information stored in a sampling point database.
FIG. 10 is a diagram illustrating a functional configuration of a second registration part.

FIG. 9 is a diagram illustrating an example of the sampling point information stored in the sampling point database. As illustrated in FIG. 9, the sampling point DB 150 stores the sampling points extracted from the specified comparing source CT image, and the corresponding points computed based on the comparing destination CT image group, in correspondence with each other.

Next, a more detailed description will be given of the functions of the second registration part 142. FIG. 10 is a diagram illustrating a functional configuration of the second registration part.

As illustrated in FIG. 10, in the image processing apparatus 120, the second registration part 142 causes the computer to function as a sampling point acquiring part 1001, a search range determination part 1002, and a corresponding point searching part 1003.

The sampling point acquiring part 1001 acquires, from the sampling point DB 150, the corresponding points corresponding to the plurality of sampling points computed by the first registration part 141.

The search range determination part 1002 generates the reconstructed image using the comparing destination CT image group located between the corresponding points of the sampling points acquired by the sampling point acquiring part 1001, and determines a search range in which the corresponding point of the target point is to be searched.

The corresponding point searching part 1003 searches the corresponding point of the target point, with respect to the reconstructed image that is determined as the search range by the search range determination part 1002. In addition, the corresponding point searching part 1003 outputs the reconstructed image and coordinates of the searched corresponding point of the target point (coordinates in the reconstructed image and coordinates in the comparing destination CT image). The reconstructed image output from the corresponding point searching part 1003 is once output to the RAM 203 or the like and stored in the RAM 203 or the like. Thereafter, the display control part 143 outputs (displays) the reconstructed image in the enlarged display screen 402 of the parallel display screen 300.

Next, a description will be given of a particular example of the process of the second registration part 142, by referring to FIGS. 11 through 14.

Figure 11:
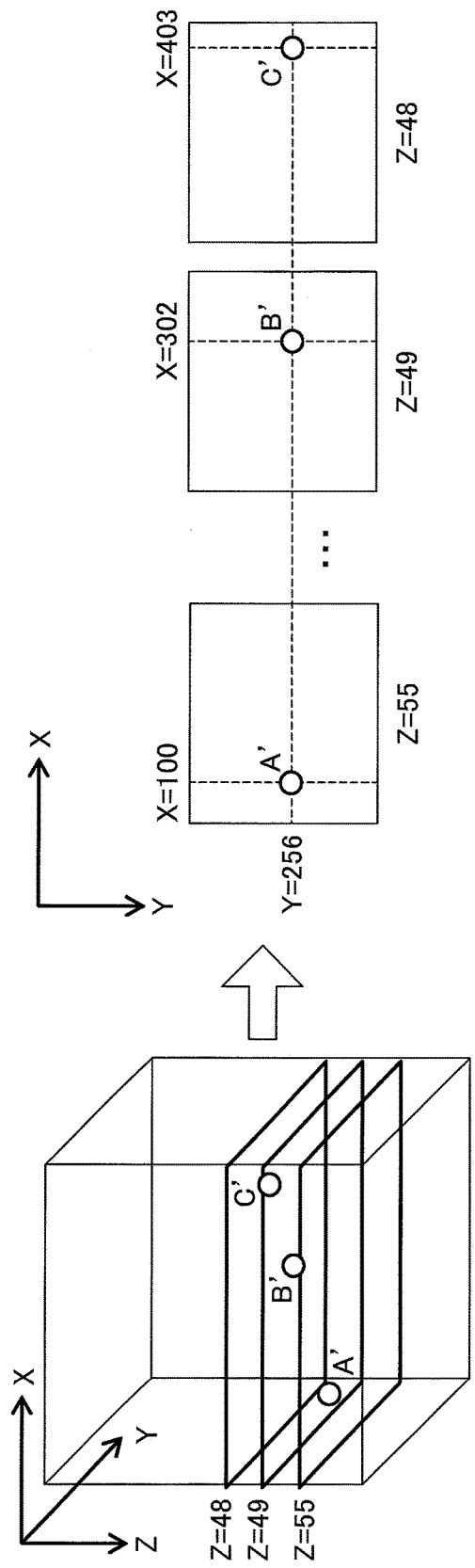
FIG. 11 is a diagram illustrating a positional relationship of the corresponding points of the sampling points in a state viewed from a Z-axis direction.

FIG. 11 is a diagram illustrating a positional relationship of the corresponding points of the sampling points in a state viewed from the Z-axis direction. As described above, the points A', B', and C' exist in the XY-plane image at Z=55, the XY-plane image at Z=49, and the XY-plane image at Z=48, respectively. In other words, the points A', B', and C' are located on the XZ-plane images at Y=256, and as illustrated in FIG. 11, the Y-coordinates of the points A', B', and C' are the same.

In the case of the example illustrated in FIG. 11, the sampling point acquiring part 1001 acquires, as the corresponding points, the point A' at (100, 256, 55), the point B' at (302, 256, 49), and the point C' at (403, 256, 48).

Figure 12B:
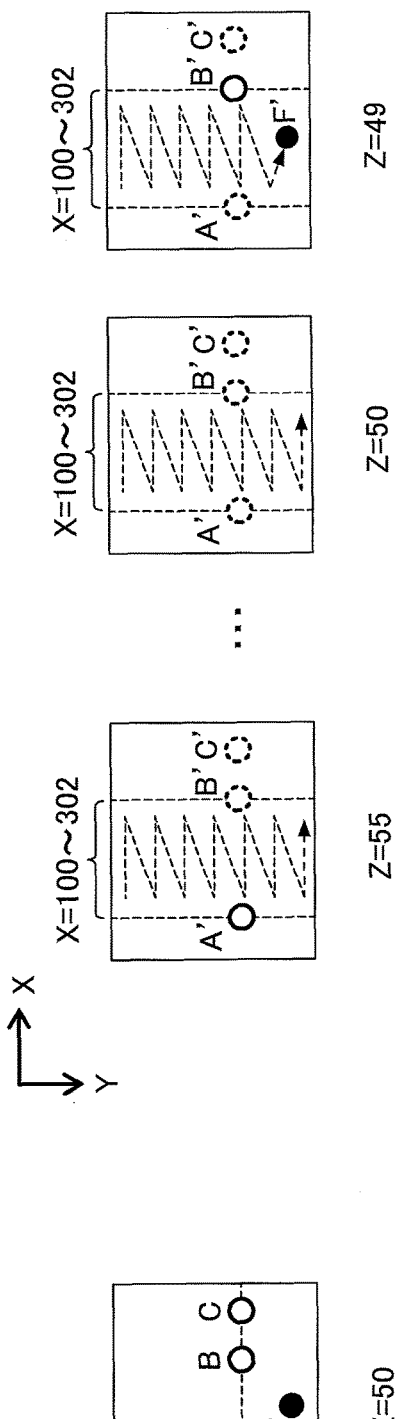
FIGS. 12A, 12B, and 12C are diagrams for explaining a range in which the corresponding point of the target point exists.
Figure 12C:
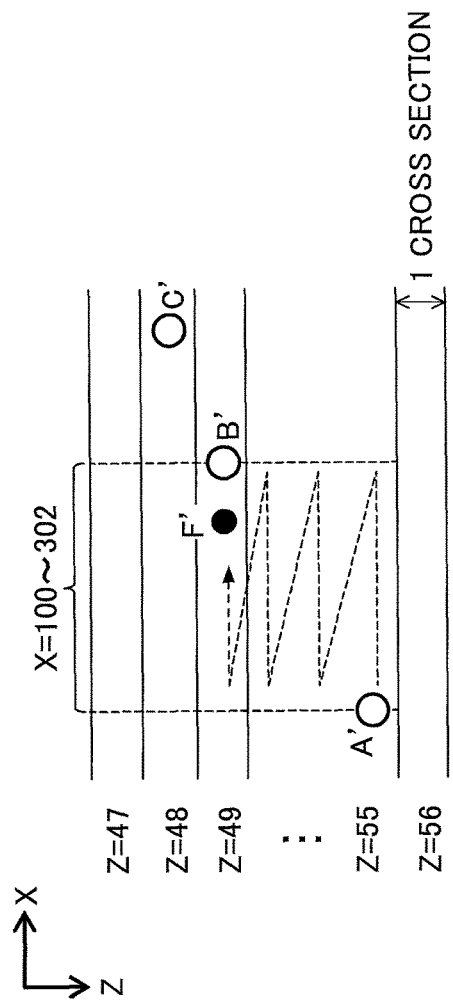
Figure 12A:
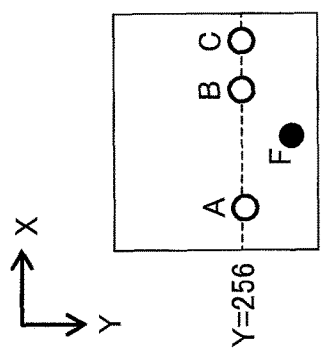

A range in which the corresponding point F' of the target point F may exist (range to be searched when searching for the corresponding point F' of the target point F) will be considered for a case in which the positional relationship of the corresponding points A', B', and C' of the sampling points A, B, and C is as illustrated in FIG. 11. FIGS. 12A, 12B, and 12C are diagrams for explaining the range in which the corresponding point of the target point exists. As described above, the target point F is surrounded by the sampling points (points A and B in this embodiment) along the X-axis direction, and thus, the corresponding point F' of the target point F is also surrounded by the corresponding points (points A' and B') of the sampling points as illustrated in FIG. 12A because tissues within the patient's body will not make a twisting movement. For this reason, it is possible to extract the corresponding point F' of the target point F by searching the following range illustrated in FIG. 12B.

The XY-plane image at Z=55: All Y-coordinates from the X-coordinate (X=100) of the point A' to the X-coordinate (X=302) of the point B';

The XY-plane image at Z=50: All Y-coordinates from the X-coordinate (X=100) of the point A' to the X-coordinate (X=302) of the point B'; and The XY-plane image at Z=49: All Y-coordinates from the X-coordinate (X=100) of the point A' to the X-coordinate (X=302) of the point B'.

In other words, a range (X=100 to 302) on the XY-plane of the corresponding points of the sampling points is searched within a slice position range (Z=49 to 55) specified based on the slice positions of the corresponding points of the sampling points surrounding the target point, as illustrated in FIG. 12C. Hence, it is possible to extract the corresponding point F' of the target point F.

In this embodiment, the search is not performed directly with respect to the above described range, and the search is performed with respect to the reconstructed image that is generated based on the above described range.

Figure 13A:
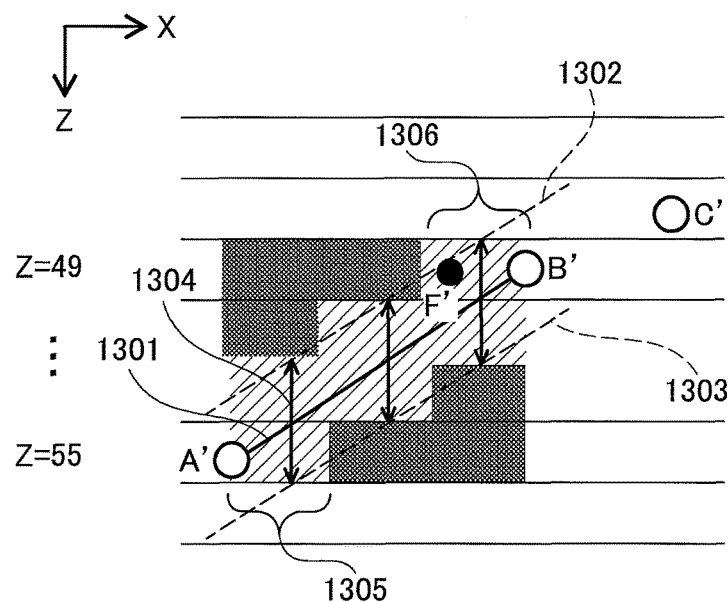
FIGS. 13A and 13B are diagrams for explaining a method of generating a reconstructed image by a search range determination part.
Figure 13B:
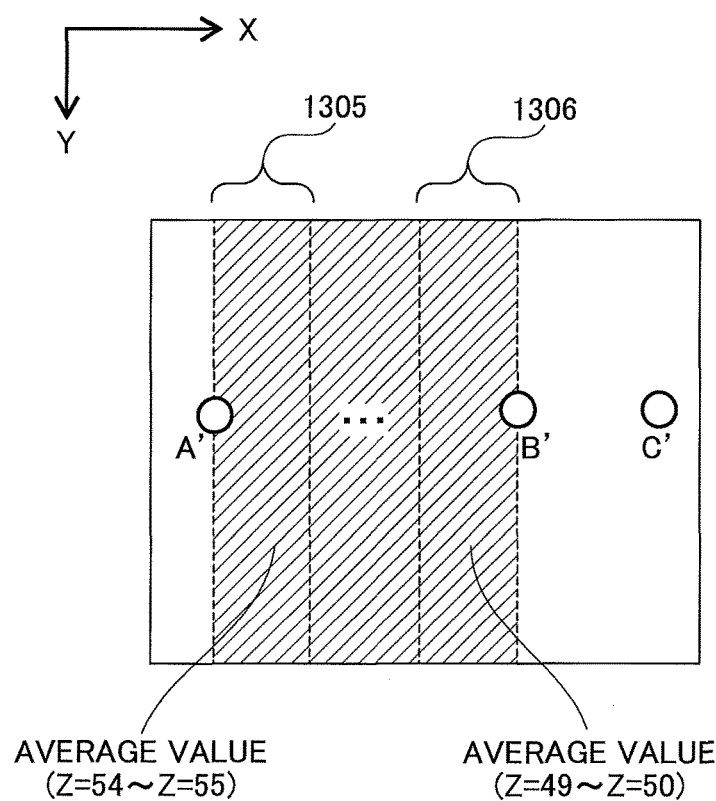

FIGS. 13A and 13B are diagrams for explaining a method of generating the reconstructed image by the search range determination part. FIG. 13A illustrates a state of the corresponding points (points A', B', and C') of the sampling points (points A, B, and C) viewed from the Y-axis direction.

As illustrated in FIG. 13A, the search range determination part 1002 computes a straight line 1301 passing through the corresponding points (points A' and B') of the sampling points (points A and B) surrounding (or sandwiching) the target point F.

In addition, the search range determination part 1002 computes 2 straight lines parallel to the straight line 1301, that is, straight lines 1302 and 1303 arranged at an interval (spacing) indicated by an arrow 1304 along the Z-axis direction. The straight lines 1302 and 1303 are arranged on opposite sides of the straight line 1301, so that the interval from the straight line 1302 to the straight line 1301 along the Z-axis direction becomes the same as the interval from the straight line 1303 to the straight line 1301 along the Z-axis direction. A number of XY-planes included in the interval indicated by the arrow 1304 may also be referred to as "an offset number (K)". In the example illustrated in FIGS. 13A and 13B, the straight lines 1302 and 1303 are computed so that the offset number K becomes K=2.

In addition, the search range determination part 1002 specifies a region (partial region along the X-axis direction) surrounded by the straight lines 1302 and 1303, from amongst the XY-plane images from the XY-plane image (at Z=55) in which the point A' exists to the XY-plane image (at Z=49) in which the point B' exists. For example, in the case of the XY-plane image at Z=55, a partial region 1305 is specified as the region along the X-axis direction surrounded by the straight lines 1302 and 1303. For example, in the case of the XY-plane image at Z=49, a partial region 1306 is specified as the region along the X-axis direction surrounded by the straight lines 1302 and 1303.

FIG. 13B illustrates a state in which the partial regions along the X-axis direction are extracted from each of the XY-plane images from the XY-plane image at Z=55 to the XY-plane image at Z=49, and arranged in the X-axis direction, and viewed from the Z-axis direction.

The search range determination part 1002 obtains an average value of each of corresponding pixels in the partial regions having the same range along the X-axis direction (partial regions that overlap when viewed from the Z-axis direction) amongst each of the partial regions extracted from each of the XY-plane images, and reconstructs the image based on average pixel values of the partial regions.

For example, the partial region 1305 extracted from the XY-plane image at Z=55 and the partial region 1305 extracted from the XY-plane image at Z=54 have the same range along the X-axis direction. For this reason, the average value is obtained for the pixel value of each pixel of the partial region 1305 extracted from the XY-plane image at Z=55 and the pixel value of each pixel of the partial region 1305 extracted from the XY-plane image at Z=54, so as to reconstruct the image of the partial region 1305.

Similarly, the partial region 1306 extracted from the XY-plane image at Z=50 and the partial region 1306 extracted from the XY-plane image at Z=49 have the same range along the X-axis direction. For this reason, the average value is obtained for the pixel value of each pixel of the partial region 1306 extracted from the XY-plane image at Z=50 and the pixel value of each pixel of the partial region 1306 extracted from the XY-plane image at Z=49, so as to reconstruct the image of the partial region 1306.

Accordingly, the search range determination part 1002 can reconstruct the image in each of the partial regions between the points A' and B'. As a result, the search range determination part 1002 can generate one reconstructed image that includes the corresponding point F' of the target point F and a small number of partial regions that overlap when viewed from the Z-axis direction, using the comparing destination CT image group located between the points A' and B'. In a case in which the number of partial regions that overlap when viewed from the Z-axis direction is large, it is difficult to search the corresponding point F' of the target point F. However, the search speed of the corresponding point F' of the target point F can be improved by reducing the number of partial regions that overlap when viewed from the Z-axis direction.

The search range determination part 1002 determines, as the search range in which the corresponding point F' of the target point F is to be searched, the reconstructed image that is generated by the method described above. The corresponding point searching part 1003 can search the corresponding point F' of the target point F within this search range determined by the search range determination part 1002.

Therefore, the search range determination part 1002 generates the reconstructed image using a part of the regions included in a part of the comparing destination CT images in the comparing destination CT image group, and the corresponding point searching part 1003 searches the corresponding point F' of the target point F using the generated reconstructed image as the search range. For this reason, compared to a case in which the search is performed using, as the search range, all of the comparing destination CT images included the comparing destination CT image group, this embodiment can reduce a search time that is required to search the corresponding point F' of the target point F.

In addition, the search range determination part 1002 generates the reconstructed image by excluding regions indicated by hatching in FIG. 13A, amongst a part of the regions included in the comparing destination CT images. Consequently, it is possible to reduce a time required to generate the reconstructed image, without deteriorating an accuracy of the search.

The method of generating the reconstructed image is not limited to the above described method that is based on the average value of the pixel values of each of the pixels. For example, the reconstructed image may be generated using a method that is based on a maximum value of the pixel values of each of the pixels.

Figure 14B:
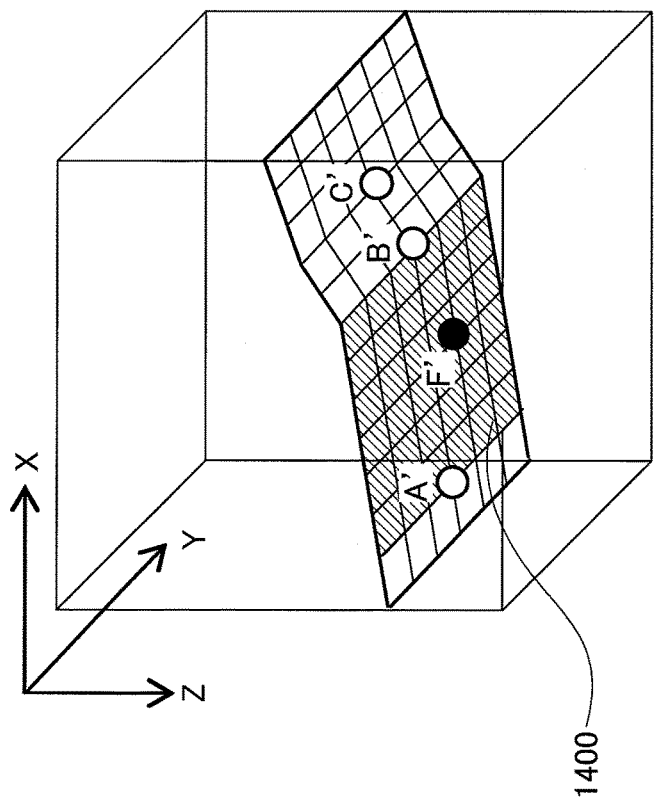
FIGS. 14A and 14B are diagrams schematically illustrating the reconstructed image generated by the search range determination part.
Figure 14A:
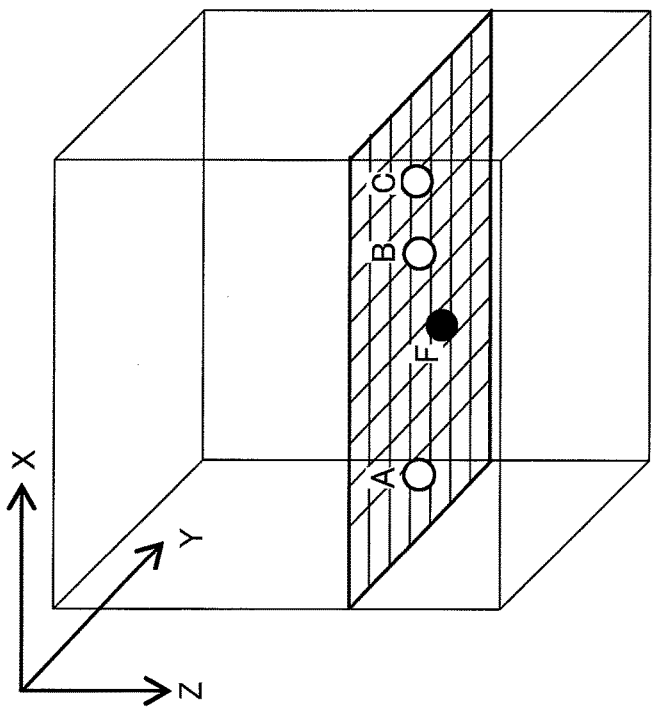

FIGS. 14A and 14B are diagrams schematically illustrating the reconstructed image generated by the search range determination part. FIG. 14A illustrates a state in which the health care professional specifies the target point F on the XY-plane image at Z=50 in the comparing source CT image. FIG. 14B illustrates the search range in which the corresponding point F' of the target point F is searched in the comparing destination CT image.

As illustrated in FIG. 14B, a reconstructed image 1400 is generated along a straight line connecting the corresponding points (points A' and B') of the sampling points (points A and B), in the region surrounded by the corresponding points (points A' and B') of the sampling points (points A and B). The corresponding point searching part 1003 searches the corresponding point F' of the target point F in the reconstructed image 1400.

Figure 15:
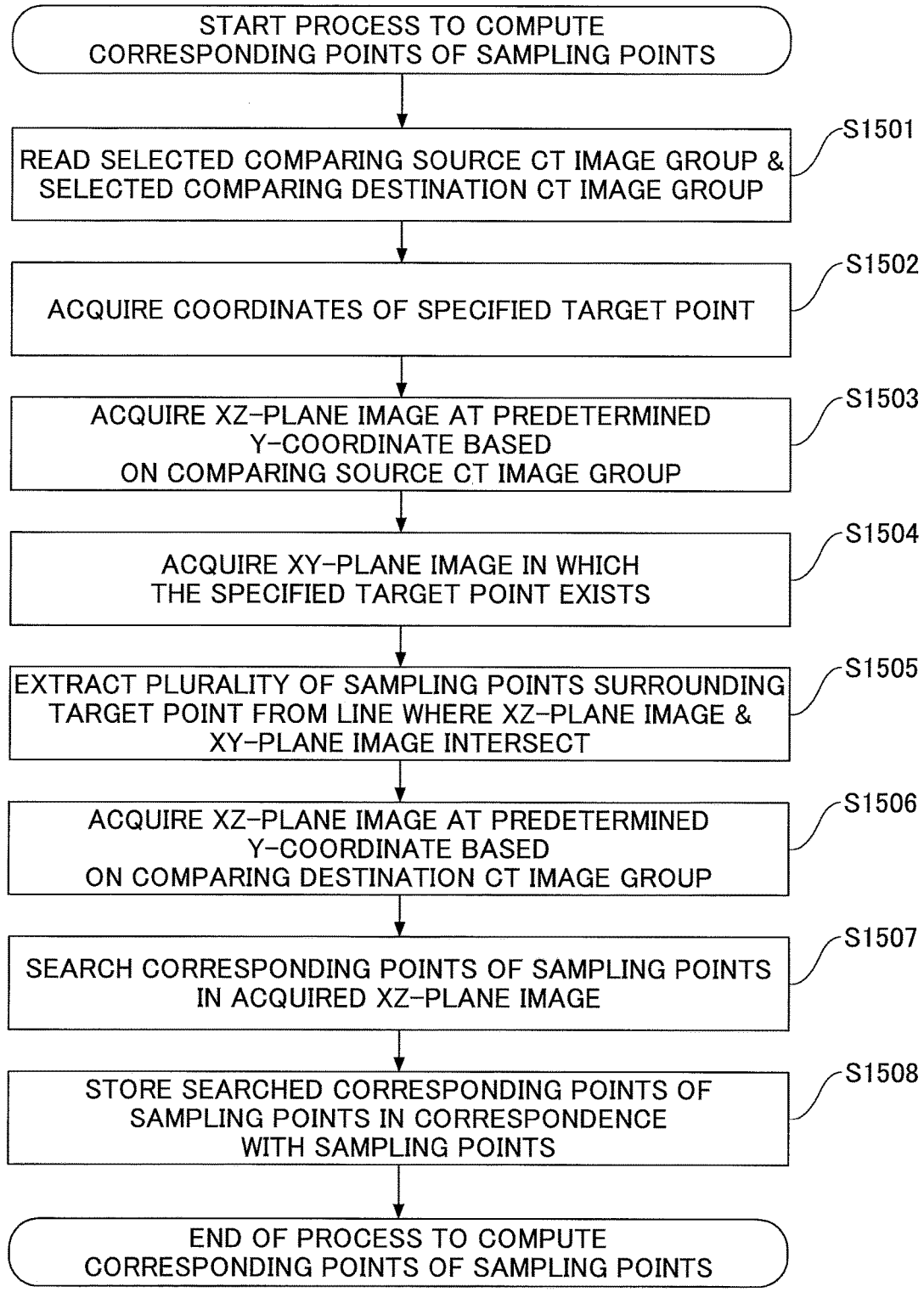
FIG. 15 is a flow chart of a process to compute the corresponding points of the sampling points.

Next, a description will be given of a process of the first registration part 141 to compute the corresponding points of the sampling points. FIG. 15 is a flow chart of the process to compute the corresponding points of the sampling points.

When the process of the first registration part 141 starts, the sampling point extracting part 601 in step S1501 reads the captured image groups selected by the health care professional as the comparing source CT image group and the comparing destination CT image group, from the captured image groups stored in the image DB 130. Amongst the captured image groups requiring confirmation of the change in the diseased or affected part with the lapse of time, the captured image group captured before the lapse of time is selected by the health care professional as the comparing source CT image group, and the captured image group captured after the lapse of time is selected by the health care professional as the comparing destination CT image group.

The sampling point extracting part 601 in step S1502 identifies the comparing source CT image that is specified by the health care professional, from amongst the read comparing source CT image group, and acquires the coordinates of the target point specified by the health care professional in the identified comparing source CT image.

The sampling point extracting part 601 in step S1503 acquires the XZ-plane image at the predetermined Y-coordinate, based on the comparing source CT image group read in step S1501.

The sampling point extracting part 601 in step S1504 acquires, as the XY-plane image, the comparing source CT image identified in step S1502.

The sampling point extracting part 601 in step S1505 obtains an intersecting line where the XZ-plane image acquired in step S1503 and the XY-plane image acquired in step S1504 intersect. Further, the sampling point extracting part 601 extracts the plurality of sampling points surrounding the target point from the intersecting line.

The corresponding point searching part 602 in step S1506 acquires the XZ-plane image from the comparing destination CT image group, using the predetermined Y-coordinate used to acquire the XZ-plane image in step S1503.

The corresponding point searching part 602 in step S1507 extracts the corresponding points of the sampling points, by searching within the XZ-plane image acquired in step S1506, with respect to the plurality of sampling points extracted in step S1505.

The DB generating part 603 in step S1508 generates the sampling point information by obtaining the correspondence between the sampling points extracted in step S1505 and the corresponding points searched in step S1507. The DB generating part 603 stores the generated sampling point information in the sampling point DB 150.

Figure 16:
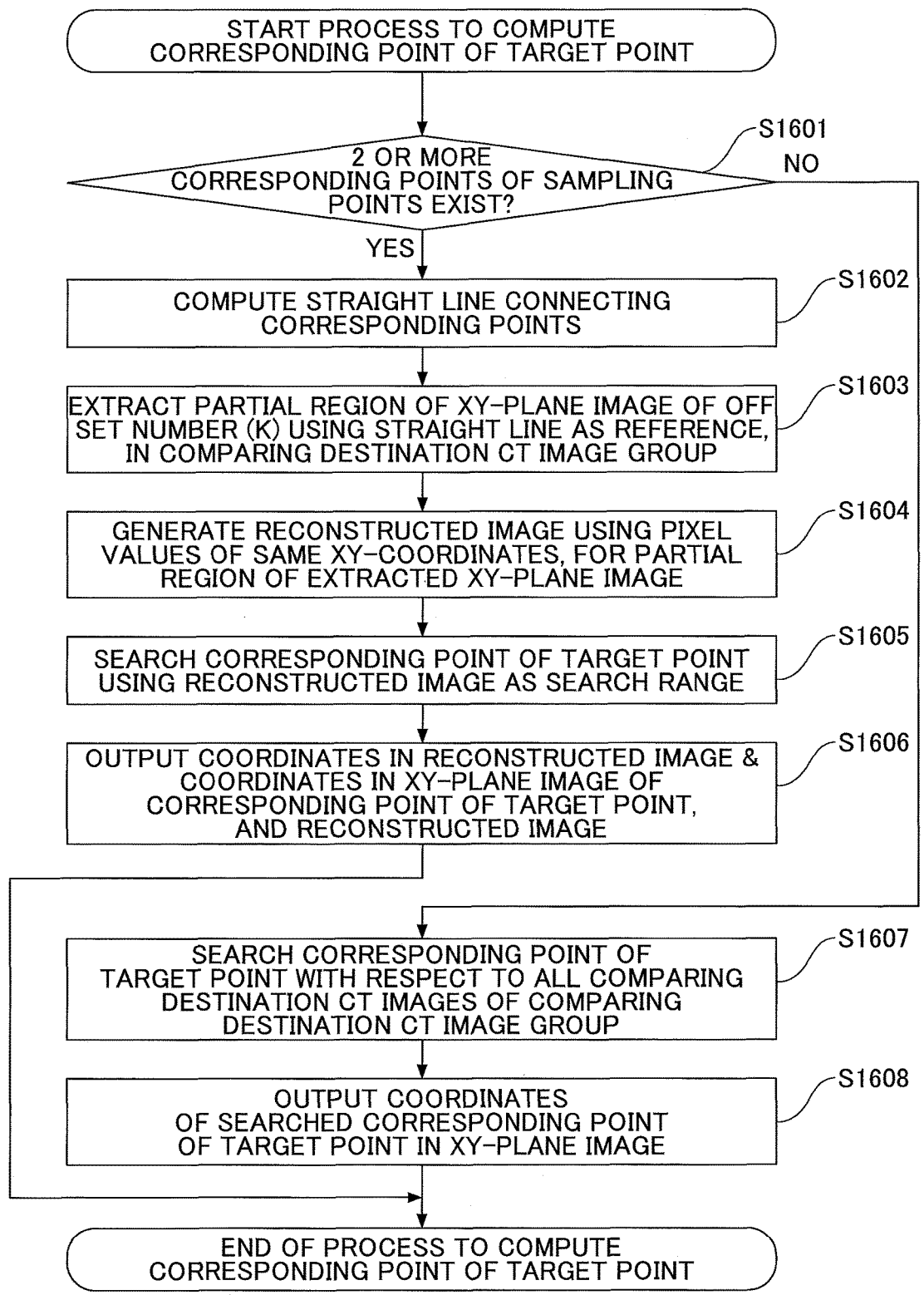
FIG. 16 is a flow chart of a process to compute the corresponding point of the target point.

Next, a description will be given of a process of the second registration part 142 to compute the corresponding point of the target point. FIG. 16 is a flow chart of the process to compute the corresponding point of the target point.

When the process of the second registration part 142 starts, the sampling point acquiring part 1001 in step S1601 judges whether two or more corresponding points exist with respect to the sampling points extracted by the first registration part 141. The process advances to step S1607 when two or more corresponding points do not exist with respect to the sampling points and the judgment result in step S1601 is NO.

In step S1607, the search range determination part 1002 determines all of the comparing destination CT images (XY-plane images) as the search range, and the corresponding point searching part 1003 searches the corresponding point of the target point within the determined search range.

The corresponding point searching part 1003 in step S1608 outputs the coordinates (coordinates in the XY-plane image) of the corresponding point of the target point searched in step S1607.

On the other hand, the process advances to step S1602 when two or more corresponding points exist with respect to the sampling points and the judgment result in step S1601 is YES. The search range determination part 1002 in step S1602 computes the straight line connecting the corresponding points of the sampling points, in the comparing destination CT image groups.

The search range determination part 1002 in step S1603 extracts the partial regions of the XY-plane image amounting to the offset number (K) from the comparing destination CT image group, using the straight line computed in step S1602 as a reference.

The search range determination part 1002 in step S1604 generates the reconstructed image by obtaining the average value of each of corresponding pixels in the partial regions having the same range along the X-axis direction amongst each of the partial regions extracted in step S1603. In addition, the search range determination part 1002 determines the generated reconstructed image as the search range in which the corresponding point F' of the target point F is to be searched.

The corresponding point searching part 1003 in step S1605 searches the corresponding point F' of the target point F, using the reconstructed image generated in step S1604 as the search range.

The corresponding point searching part 1003 in step S1606 outputs the coordinates in the reconstructed image and the coordinates in the XY-plane image of the corresponding point F' searched in step S1605, and the reconstructed image.

The reconstructed image output from the corresponding point searching part 1003 is displayed on the enlarged display screen 402 after being subjected to the process that cuts out and enlarges the region including the corresponding point F'. The coordinates of the corresponding point F' in the XY-plane image output from the corresponding point searching part 1003 is displayed as the corresponding point F' in the comparing destination CT image that is displayed on the parallel display screen 300.

Therefore, in the image processing apparatus 120 described above, it is possible to restrict the search range using the corresponding points in the comparing destination CT image, corresponding to the plurality of sampling points surrounding the target point in the comparing source CT image, when searching the corresponding point of the target point.

As a result, it is possible to reduce a processing time required to search the corresponding point of the target point specified in the CT image captured at one point in time from the CT images captured at other points in time.

Second Embodiment

In the first embodiment described above, the offset number (K) is fixed when extracting the partial regions from the comparing destination CT image group located between the corresponding points of the sampling points. However, the offset number (K) may be variable, as in the case of a second embodiment described hereinafter.

Figure 17A:
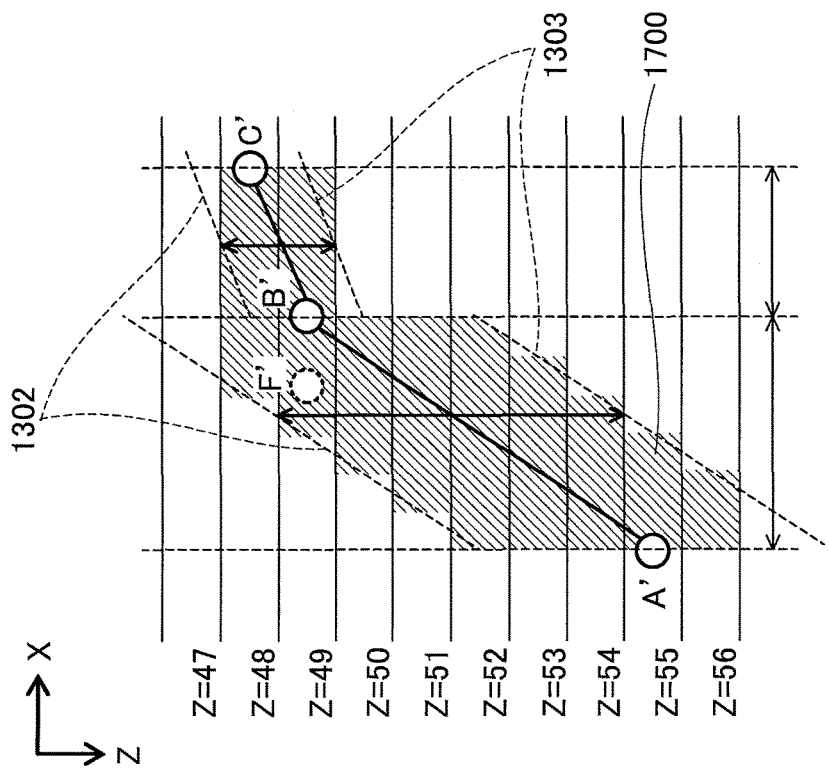
FIGS. 17A and 17B are diagrams for explaining a method of determining an offset number.
Figure 17B:
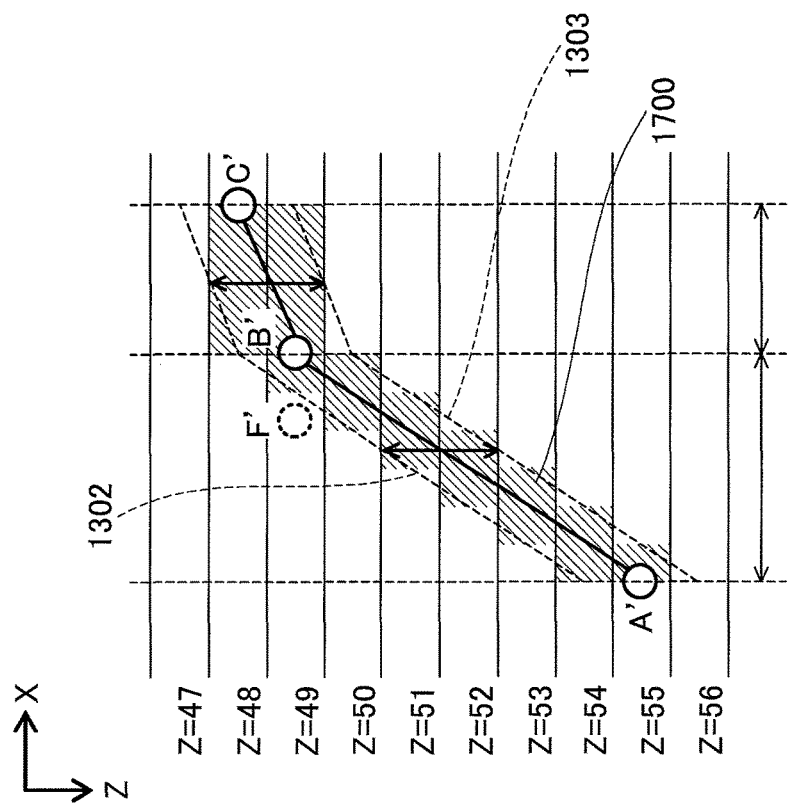

FIGS. 17A and 17B are diagrams for explaining a method of determining an offset number for the case in which the offset number is variable. FIG. 17A illustrates the straight lines 1302 and 1303 computed by the search range determination part 1002 when K=2. As illustrated in FIG. 17A, in a case in which the offset number (K) is small, the corresponding point F' of the target point F is located on an outer side of a partial region group 1700 that is used to generate the reconstructed image. In this case, the corresponding point F' of the target point F will not be extracted even when the search is performed in the reconstructed image generated based on the partial region group 1700.

FIG. 17B illustrates the straight lines 1302 and 1303 computed by the search range determination part 1002 when the offset number (K) is varied according to the distance between the corresponding points of the sampling points along the X-axis direction. In the example illustrated in FIG. 17B, the straight lines 1302 and 1303 are computed so that the distance between the corresponding point A' of the sampling point A and the corresponding point B' of the sampling point B becomes K=7. Hence, compared to the example illustrated in FIG. 17A, the size of the partial region group 1700 becomes large along the Z-axis direction. The straight lines 1302 and 1303 are computed so that the distance between the corresponding point B' of the sampling point B and the corresponding point C' of the sampling point C becomes K=2.

According to the second embodiment, the offset number (K) is set large when the distance between the corresponding points of the sampling points is long, and the offset number (K) is set small when the distance between the corresponding points of the sampling points is short. When the distance between the corresponding points of the sampling points is long, a deviation width in the Z-axis direction also becomes large between the target point F in the comparing source CT image and the corresponding point F' in the comparing destination CT image. For this reason, the second embodiments set the offset number (K) large, so that the corresponding point F' of the target point F is included in the partial region group 1700 and the corresponding point F' can be positively searched by avoiding omission.

Figure 18:
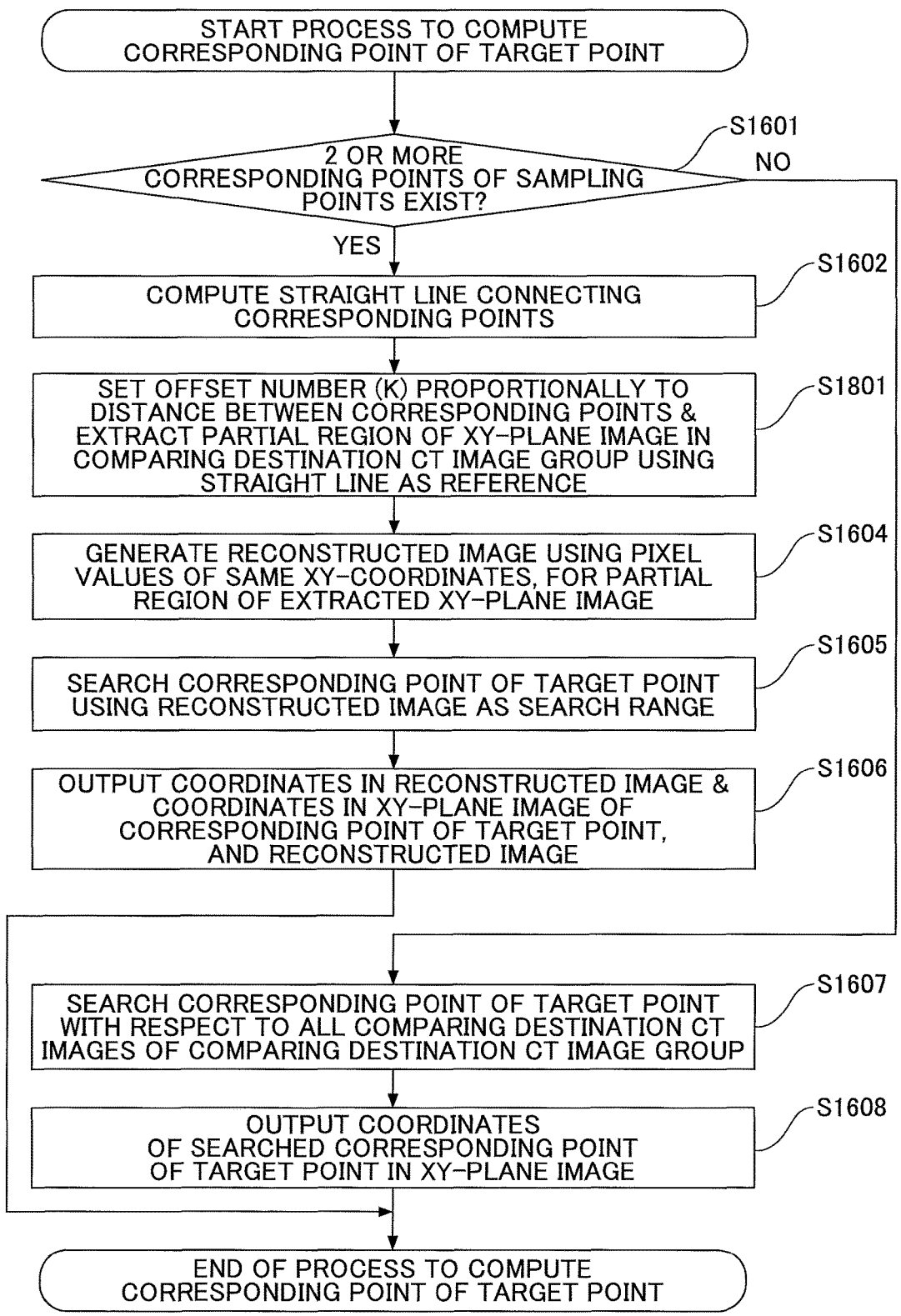
FIG. 18 is a flow chart of the process to compute the corresponding point of the target point.

Next, a description will be given of the process of the second registration part 142 to compute the corresponding point of the target point in the second embodiment. FIG. 18 is a flow chart of the process to compute the corresponding point of the target point.

When the process of the second registration part 142 starts, the process starts from step S1601. Processes of steps S1601 and S1602 are the same as those of the corresponding steps in FIG. 16, and a description thereof will be omitted.

The search range determination part 1002 in step S1801 sets the offset number (K) according to the distance between the corresponding points of the sampling points. In addition, the search range determination part 1002 extracts the partial region of the XY-plane image in the comparing destination CT image group, using the straight line computed in step S1602 as a reference. Processes of steps S1604 through S1608 are the same as those of the corresponding steps in FIG. 16, and a description thereof will be omitted.

As described above, in the image processing apparatus 120 of the second embodiment, the offset number (K) can be variably set according to the distance between the corresponding points of the sampling points. For this reason, it is possible positively search the corresponding point of the target point by avoiding omission.

Third Embodiment

In the first and second embodiments described above, the region including the corresponding point F' is cut out from the reconstructed image and enlarged to be displayed on the enlarged display screen. On the other hand, in a third embodiment, the region including the corresponding point of the target point is cut out from the XY-plane image in which the corresponding point of the target point exists, enlarged, and displayed on the enlarged display screen, as described hereinafter.

Figure 19:
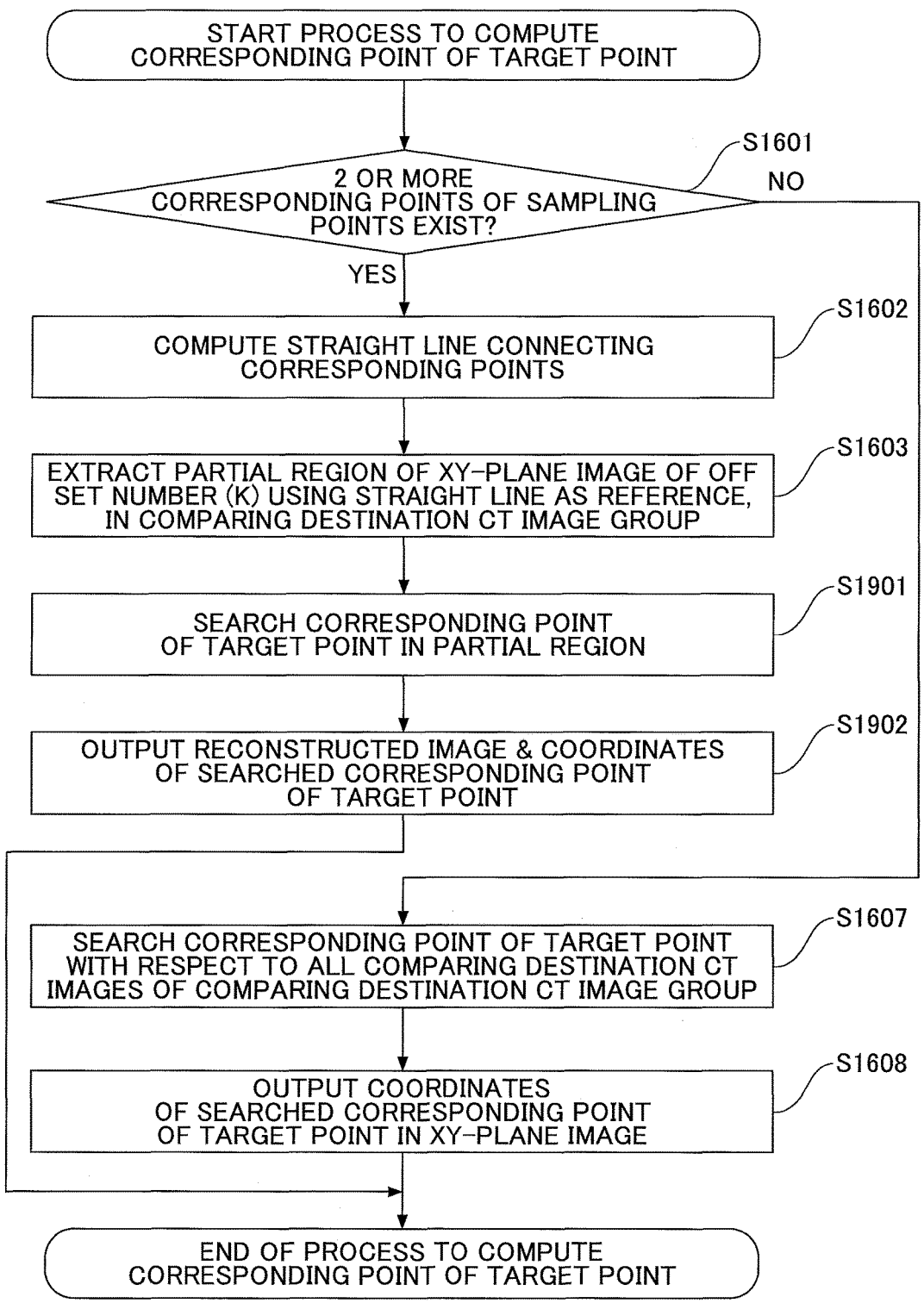
FIG. 19 is a flow chart of the process to compute the corresponding point of the target point.

FIG. 19 is a flow chart of the process to compute the corresponding point of the target point in the third embodiment. When the process of the second registration part 142 starts, the process starts from step S1601. Processes of steps S1601 through S1603, S1607, and S1608 are the same as those of the corresponding steps in FIG. 16, and a description thereof will be omitted.

The corresponding point searching part 1003 in step S1901 searches the corresponding point F' of the target point F using the partial region extracted from each XY-plane image in step S1603 as the search range.

The corresponding point searching part 1003 in step S1902 outputs the coordinates (coordinates in the XY-plane image) of the corresponding point of the target point searched by step S1901. Hence, the display control part 143 can display the enlarged display screen by performing the process of cutting out and enlarging the region including the corresponding point of the target point from the XY-plane image in which the corresponding point of the target point exists, based on the coordinates of the corresponding point of the target point output from the corresponding point searching part 1003.

Figure 20:
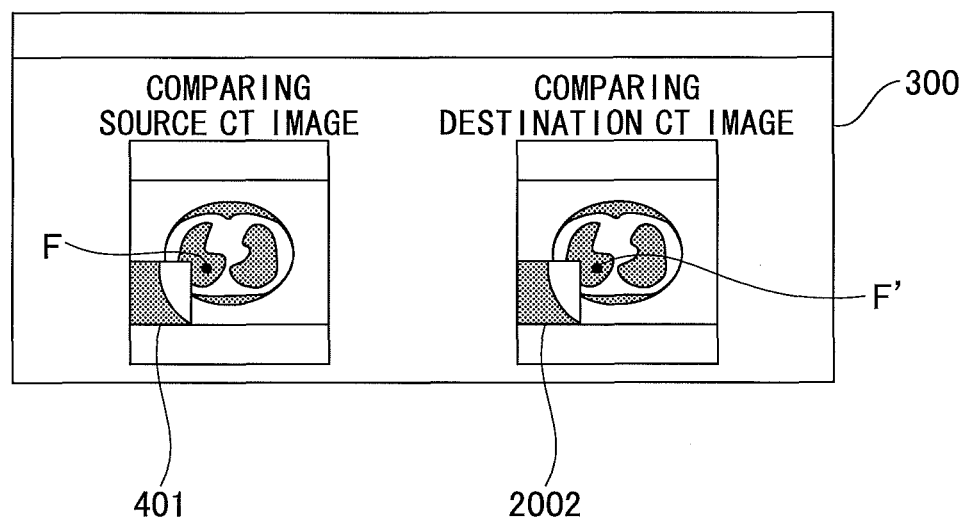
FIG. 20 is a diagram illustrating an example of the parallel display screen.

FIG. 20 is a diagram illustrating an example of the parallel display screen. FIG. 20 illustrates an example of the parallel display screen 300 that is displayed on the display part 206 based on the coordinates of the corresponding point of the target point output from the corresponding point searching part 1003 in step S1902. When displaying an enlarged display screen 202 illustrated in FIG. 20, the display control part 143 reads from the image DB 130 the comparing destination CT image having a Z-coordinate that is the same as the Z-coordinate of the corresponding point of the target point output from the corresponding point searching part 1003 in step S1902.

The display control part 143 displays the read comparing destination CT image on the parallel display screen 300. In addition, the display control part 143 cuts out and enlarges the region including the coordinates of the corresponding point of the target point output from the corresponding point searching part 1003, from the read comparing destination CT image, and displays the cut out and enlarged region on the enlarged display screen 2002.

Accordingly, when diagnosing the target point, it is possible to cope with the needs of a health care professional desiring the display of the XY-plane image on the enlarged display screen in place of the reconstructed image.

Fourth Embodiment

In the third embodiment described above, the target point in the comparing source CT image is fixedly specified. On the other hand, in a fourth embodiment, the position of the target point specified in the comparing source CT image is movable. Even in a case in which the position of the target point specified in the comparing source CT image is moved, it is possible to utilize the partial region of the XY-plane image used at a time of searching the corresponding point of the target point before the position of the target point is moved, as described hereinafter.

FIGS. 21A and 21B are diagrams illustrating an example of a change in the parallel display screen in the fourth embodiment. FIG. 21A illustrates a positional relationship between the corresponding points (A', B', and C') of the sampling points (A, B, and C) and the corresponding point F' of the target point F before and after moving the position of the target point F, in a state viewed from the Y-axis direction. On the other hand, FIG. 21B illustrates display contents of the parallel display screen 300 before and after moving the position of the target point F that is specified.

As illustrated in FIG. 21A, suppose that the corresponding points (points A' and B') of the sampling points (points A and B) surrounding the target point F before the position of the target point F is moved exists in each of the XY-plane image at Z=55 and the XY-plane image at Z=49. In addition, suppose that the corresponding point F' of the target point F before the position of the target point F is moved exists in the XY-plane image at Z=49.

In this case, the corresponding point searching part 1003 extracts the partial region from each of the XY-plane images from the XY-plane image at Z=49 to the XY-plane image at Z=55. For this reason, in a case in which the target point F after the position of the target point F is moved (that is, the moved target point F) is still located between the sampling points (points A and B), the search for the corresponding F' of the moved target point F may be performed with respect to the partial regions extracted from each of the XY-plane images from the XY-plane image at Z=49 to the XY-plane image at Z=55.

FIG. 21B illustrates a case in which the corresponding point F' of the moved target point F is searched in the XY-plane images at Z=48, Z=47, . . . , and Z=55. In this case, the image of the region including the corresponding point F', cut out from the XY-plane image in which the corresponding point F' is searched, is enlarged and displayed on the enlarged display screen 2002.

Accordingly, the corresponding point F' of the moved target point F can be searched using the partial region that is extracted when computing the corresponding point F' of the target point F before the position of the target point F is moved. For this reason, it becomes possible to search the corresponding point F' of the moved target point F at a high speed.

Fifth Embodiment

In the fourth embodiment described above, the comparing destination CT image including the corresponding point F' and the enlarged display screen are switched according to the moving of the target point F that is specified. On the other hand, in a fifth embodiment, in a state in which the target point F is specified and the comparing destination CT image including the corresponding point F' and the enlarged display screen are displayed, the comparing destination CT image before or after the comparing destination CT image including the corresponding point F' and the enlarged display screen thereof are displayed according to a scroll operation, as described hereinafter.

Figure 22A:
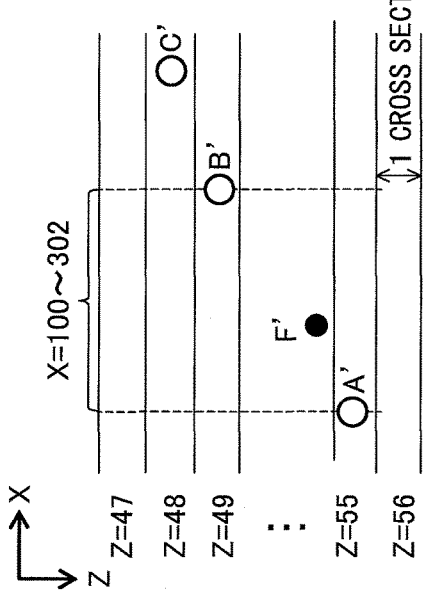
FIGS. 22A and 22B are diagrams illustrating an example of the change in the parallel display screen.
Figure 22B:
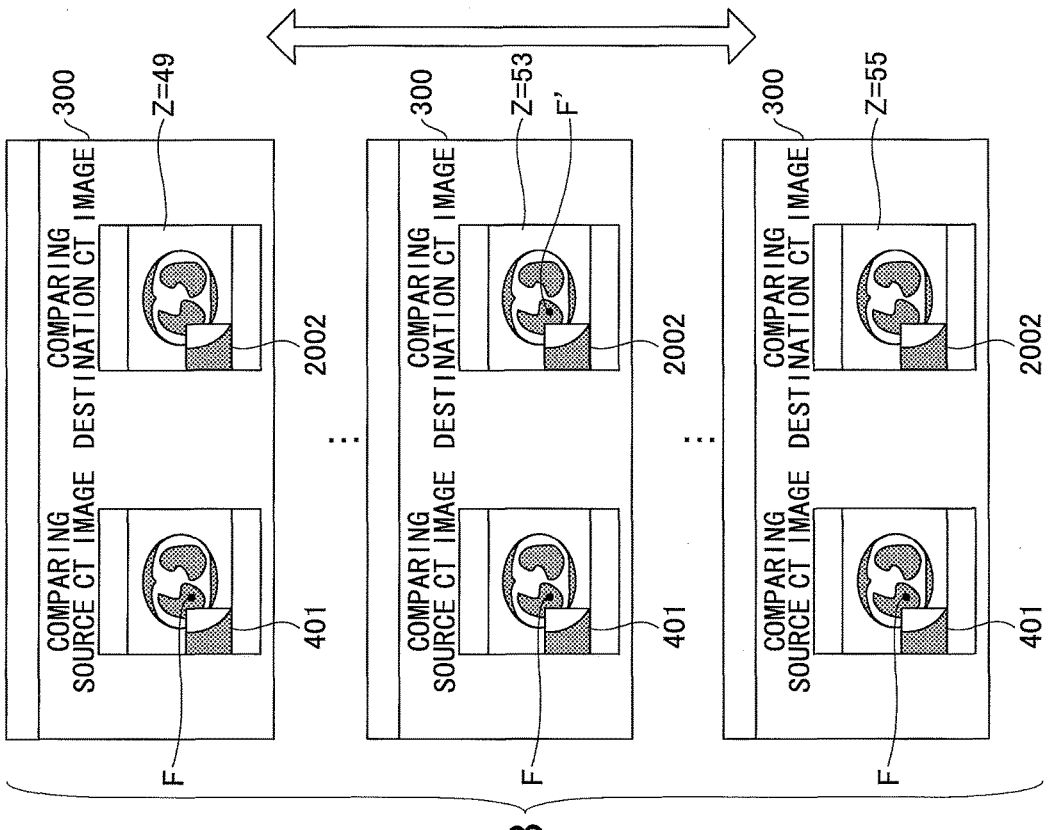

FIGS. 22A and 22B are diagrams illustrating an example of the change in the parallel display screen in the fifth embodiment. FIG. 22A illustrates a positional relationship between the corresponding points (A', B', and C') of the sampling points (A, B, and C) and the corresponding point F' of the target point F before and after moving the position of the target point F, in a state viewed from the Y-axis direction. On the other hand, FIG. 22B illustrates display contents of the parallel display screen 300 when the scroll operation is performed after the target point F is specified.

As illustrated in FIG. 22A, suppose that the corresponding points (points A' and B') of the sampling points (points A and B) surrounding the target point F exists in each of the XY-plane image at Z=55 and the XY-plane image at Z=49. In addition, suppose that the corresponding point F' of the target point F exists in the XY-plane image at Z=53.

In this state, suppose that the health care professional performs the scroll operation. In this case, the XY-plane image at Z=52 to the XY-plane image at Z=49, or the XY-plane image at Z=54 to the XY-plane image at Z=55 are successively displayed as the comparing destination CT image of the parallel display screen 300.

The enlarged display screen 2002 of each XY-plane image displays a part of the region surrounded by the corresponding points A' and B' along the X-axis direction, that is cut out from each XY-plane image and enlarged. According to the fifth embodiment, it is possible to display not only the XY-plane image that includes the corresponding point F' of the specified target point F, but also other XY-plane images adjacent thereto along the Z-axis direction according to the scroll operation. Hence, the health care professional can visually confirm, by a simple operation, the comparing destination CT images before and after the comparing destination CT image in which the corresponding point of the specified target point exists.

Sixth Embodiment

In the first through fifth embodiments described above, the corresponding points of 2 sampling points are connected by the straight line when extracting the partial region from the XY-plane image. However, the corresponding points of the sampling points may be connected by a curved line. In this case, the curved line may be obtained by approximation using a high-order equation, based on the coordinates of the corresponding points of a plurality of sampling points.

Figure 23:
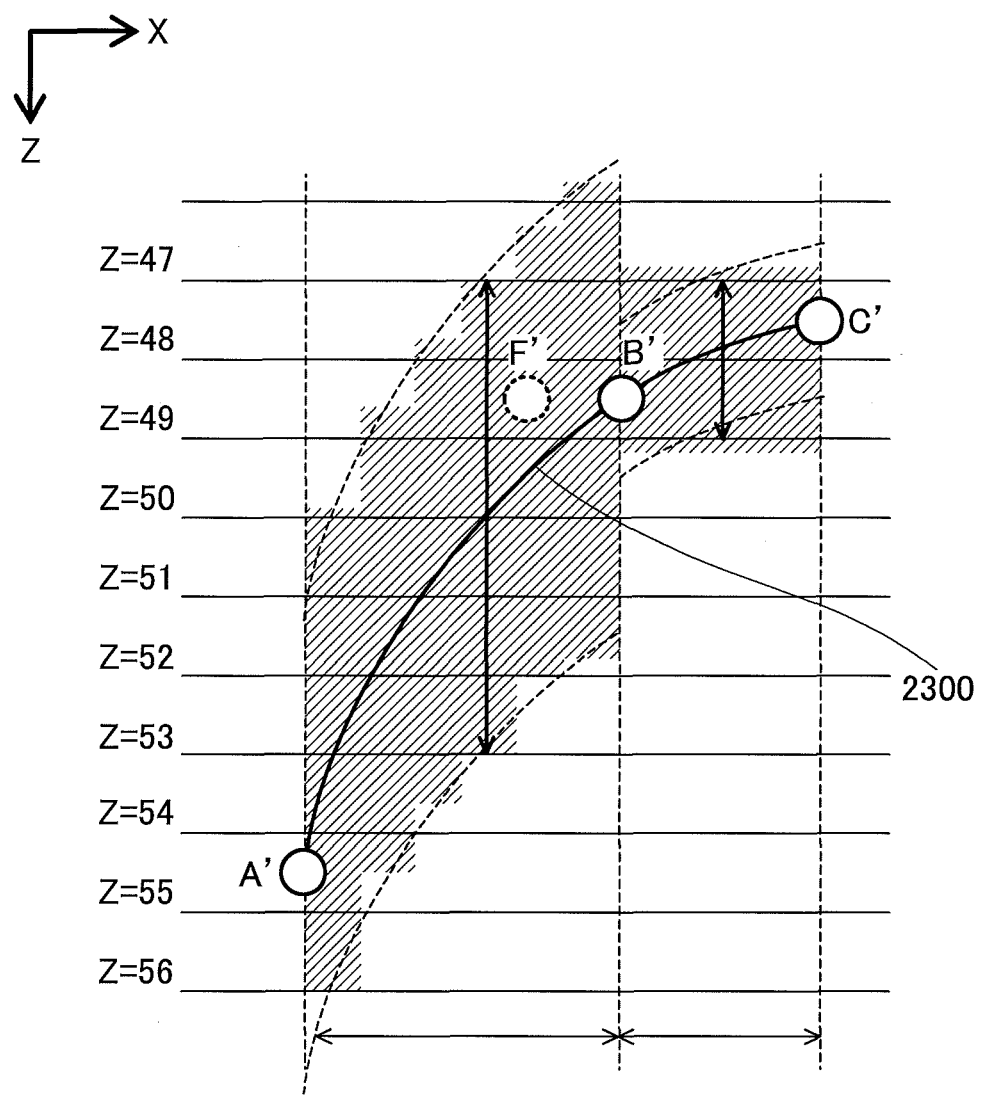
FIG. 23 is a diagram illustrating an example in which corresponding points of the sampling points are connected by a curve.

FIG. 23 is a diagram illustrating an example in which corresponding points of the sampling points are connected by a curve in the sixth embodiment. In the example illustrated in FIG. 23, the corresponding points (points A', B', and C') of the plurality of sampling pints (points A, B, and C) are approximated by the high-order equation, to compute a curve 2300.

When the corresponding points of the sampling points are connected by the curve 2300, it is possible to change the offset number (K) according to the distance between the corresponding points, similarly as in the case of the second embodiment described above.

In the first through fifth embodiments described above, the sampling points surrounding the target point along the X-axis direction are extracted as the sampling points surrounding the target point. However, the sampling points surrounding the target point are not limited to the sampling points surrounding the target point along the X-axis direction, and may be sampling points surrounding the target point along the Y-axis direction, for example.

FIGS. 24A, 24B, and 24C are diagrams for explaining a positional relationship of the target point and the sampling points. As illustrated in FIG. 24A, suppose that the health care professional specifies the target point F on the XY-plane image at Z=50.

In this case, it is possible to extract the sampling points having the same Y-coordinate and surrounding the target point F along the X-axis direction as illustrated in FIG. 21B, or extract the sampling points having the same X-coordinate and surrounding the target point F along the Y-axis direction as illustrated in FIG. 21C.

In the case in which the sampling points surrounding the target point F along the X-axis direction are extracted, the corresponding points of the sampling points are searched in the XZ-plane image that is computed based on the comparing destination CT image group. On the other hand, in the case in which the sampling points surrounding the target point F along the Y-axis direction are extracted, the corresponding points of the sampling points are searched in the YZ-plane image that is computed based on the comparing destination CT image group.

In the case of the sampling points (points A and B) surrounding the target point F along the X-axis direction, when the X-coordinates of the points A and B are denoted by $X_A$ and $X_B$, respectively, and the X-coordinate of the target point F is denoted by $X_F$, a relationship $X_A<X_F<X_B$ stands. On the other hand, in the case of the sampling points (points α and β) surrounding the target point F along the Y-axis direction, when the Y-coordinates of the points α and β are denoted by $Y_\alpha$ and $Y_\beta$, respectively, and the Y-coordinate of the target point F is denoted by $Y_F$, a relationship $Y_\beta<Y_F<Y_\alpha$ stands.

In the first through sixth embodiments described above, in the case in which 2 or more corresponding points of the sampling points do not exist when the process of the second registration part 142 is performed, the corresponding point of the target point is searched with respect to all of the comparing destination CT images of the comparing destination CT image group. However, in the case in which 2 or more corresponding points of the sampling points do not exist, the extraction of the sampling points may be repeated in the first registration part 141 until the number of corresponding points of the sampling points becomes 2 or more.

The first through sixth embodiments are described above for the case in which the CT image is displayed. However, it is possible to display medical images other than the CT image, such as an MRI (Magnetic Resonance Imaging) image, for example.

According to the embodiments described above, it is possible to reduce a processing time required to search and find a target that is specified in an image captured at one point in time from images captured at another point in time.

The description above use terms such as "determine", "identify", or the like to describe the embodiments, however, such terms are abstractions of the actual operations that are performed. Hence, the actual operations that correspond to such terms may vary depending on the implementation, as is obvious to those skilled in the art.

Although the embodiments are numbered with, for example, "first," "second," "third," "fourth," "fifth," or "sixth," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
   a memory configured to store a program; and
   a processor configured to execute the program and perform a process including
      receiving an input specifying a target in a first captured image group that is obtained by slicing a three-dimensional body into a plurality of captured images at a first point in time,
      extracting a plurality of feature points surrounding the specified target from the plurality of captured images of the first captured image group,
      specifying slice positions of each of the plurality of feature points that are extracted in a plurality of captured images of a second captured image group that is obtained by slicing the three-dimensional body into the plurality of captured images at a second point in time, and
      outputting an image corresponding to a slice position range specified based on the specified slice positions of each of the plurality of extracted feature points, and corresponding to a range on a first plane specified based on positions of each of the plurality of extracted feature points on a second plane,
   wherein the extracting extracts the plurality of feature points on a line specified by three coordinate axes from the first captured image group, and
   wherein the specifying specifies a point having a similarity exceeding a threshold value with respect to each of the plurality of extracted feature points on a plane first specified by two of the three coordinate axes of the second captured image group, and specifies a point on a remaining one of the three coordinate axes to specify the slice positions of each of the plurality of extracted feature points in the second captured image group.

2. The image processing apparatus as claimed in claim 1, wherein the process further includes
   reconstructing and outputting an image between specified points, at each position on a line connecting the specified points, using a predetermined number of sliced images along a direction of the remaining one of the three coordinate axes.

3. The image processing apparatus as claimed in claim 2, wherein the predetermined number of the sliced images used for the reconstructing of the image is set proportionally to a distance between the plurality of extracted feature points on the first plane.

4. The image processing apparatus as claimed in claim 2, wherein the process further includes
   searching a reconstructed image that is obtained by the reconstructing of the image between the specified points, to extract a point corresponding to the target.

5. The image processing apparatus as claimed in claim 2, wherein the process further includes
   searching the predetermined number of sliced images along the direction of the remaining one of the three coordinate axes, at each position on a line connecting the specified points, to extract a point corresponding to the target.

6. The image processing apparatus as claimed in claim 5, wherein the process further includes
   outputting a sliced image in which the point corresponding to the target is extracted, according to moving of a position of the target that is specified.

7. An image processing method comprising:
   receiving, by a computer, an input specifying a target in a first captured image group that is obtained by slicing a three-dimensional body into a plurality of captured images at a first point in time;
   extracting, by the computer, a plurality of feature points surrounding the specified target from the plurality of captured images of the first captured image group;
   specifying, by the computer, slice positions of each of the plurality of feature points that are extracted in a plurality of captured images of a second captured image group that is obtained by slicing the three-dimensional body into the plurality of captured images at a second point in time; and
   outputting, by the computer, an image corresponding to a slice position range specified based on the specified slice positions of each of the plurality of extracted feature points, and corresponding to a range on a first plane specified based on positions of each of the plurality of extracted feature points on a second plane,
   wherein the extracting extracts the plurality of feature points on a line specified by three coordinate axes from the first captured image group, and
   wherein the specifying specifies a point having a similarity exceeding a threshold value with respect to each of the plurality of extracted feature points on a plane first specified by two of the three coordinate axes of the second captured image group, and specifies a point on a remaining one of the three coordinate axes to specify the slice positions of each of the plurality of extracted feature points in the second captured image group.

8. The image processing method as claimed in claim 7, further comprising:
reconstructing and outputting, by the computer, an image between specified points, at each position on a line connecting the specified points, using a predetermined number of sliced images along a direction of the remaining one of the three coordinate axes.

9. The image processing method as claimed in claim 8, wherein the predetermined number of the sliced images used for the reconstructing of the image is set proportionally to a distance between the plurality of extracted feature points on the first plane.

10. The image processing method as claimed in claim 8, further comprising:
searching, by the computer, a reconstructed image that is obtained by the reconstructing of the image between the specified points, to extract a point corresponding to the target.

11. The image processing method as claimed in claim 8, further comprising:
searching, by the computer, the predetermined number of sliced images along the direction of the remaining one of the three coordinate axes, at each position on a line connecting the specified points, to extract a point corresponding to the target.

12. A non-transitory computer-readable storage medium having stored therein a program for causing a computer to perform a process comprising:
receiving an input specifying a target in a first captured image group that is obtained by slicing a three-dimensional body into a plurality of captured images at a first point in time;
extracting a plurality of feature points surrounding the specified target from the plurality of captured images of the first captured image group;
specifying slice positions of each of the plurality of feature points that are extracted in a plurality of captured images of a second captured image group that is obtained by slicing the three-dimensional body into the plurality of captured images at a second point in time; and
outputting an image corresponding to a slice position range specified based on the specified slice positions of each of the plurality of extracted feature points, and corresponding to a range on a first plane specified based on positions of each of the plurality of extracted feature points on a second plane,
wherein the extracting extracts the plurality of feature points on a line specified by three coordinate axes from the first captured image group, and
wherein the specifying specifies a point having a similarity exceeding a threshold value with respect to each of the plurality of extracted feature points on a plane first specified by two of the three coordinate axes of the second captured image group, and specifies a point on a remaining one of the three coordinate axes to specify the slice positions of each of the plurality of extracted feature points in the second captured image group.

13. The non-transitory computer-readable storage medium as claimed in claim 12, wherein the process further comprises:
reconstructing and outputting an image between specified points, at each position on a line connecting the specified points, using a predetermined number of sliced images along a direction of the remaining one of the three coordinate axes.

14. The non-transitory computer-readable storage medium as claimed in claim 13, wherein the predetermined number of the sliced images used for the reconstructing of the image is set proportionally to a distance between the plurality of extracted feature points on the first plane.

15. The non-transitory computer-readable storage medium as claimed in claim 13, wherein the process further comprises:
searching a reconstructed image that is obtained by the reconstructing of the image between the specified points, to extract a point corresponding to the target.

16. The non-transitory computer-readable storage medium as claimed in claim 13, wherein the process further comprises:
searching the predetermined number of sliced images along the direction of the remaining one of the three coordinate axes, at each position on a line connecting the specified points, to extract a point corresponding to the target.

17. The non-transitory computer-readable storage medium as claimed in claim 16, wherein the process further comprises:
outputting a sliced image in which the point corresponding to the target is extracted, according to moving of a position of the target that is specified.

* * * * *